(12) United States Patent
Someya et al.

(10) Patent No.: US 10,505,913 B2
(45) Date of Patent: Dec. 10, 2019

(54) COMMUNICATION MANAGEMENT SYSTEM, ACCESS POINT, COMMUNICATION MANAGEMENT DEVICE, CONNECTION CONTROL METHOD, COMMUNICATION MANAGEMENT METHOD, AND PROGRAM

(71) Applicants: BIGLOBE Inc., Tokyo (JP); NEC Platforms, Ltd., Kanagawa (JP)

(72) Inventors: Daisuke Someya, Tokyo (JP); Nobuyuki Enomoto, Tokyo (JP); Hiroki Fukasawa, Kanagawa (JP); Tetsuya Nakamura, Kanagawa (JP)

(73) Assignees: Biglobe Inc., Tokyo (JP); NEC Platforms Ltd., Kanagawa (JP)

( * ) Notice: Subject to any disclaimer, the term of this patent is extended or adjusted under 35 U.S.C. 154(b) by 81 days.

(21) Appl. No.: 15/560,736

(22) PCT Filed: Mar. 2, 2016

(86) PCT No.: PCT/JP2016/056372
§ 371 (c)(1),
(2) Date: Sep. 22, 2017

(87) PCT Pub. No.: WO2016/152416
PCT Pub. Date: Sep. 29, 2016

(65) Prior Publication Data
US 2018/0083942 A1    Mar. 22, 2018

(30) Foreign Application Priority Data
Mar. 23, 2015    (JP) ................................ 2015-059488

(51) Int. Cl.
*H04L 29/06*    (2006.01)
*H04W 12/06*    (2009.01)
(Continued)

(52) U.S. Cl.
CPC ............ *H04L 63/08* (2013.01); *H04L 61/103* (2013.01); *H04L 61/6009* (2013.01);
(Continued)

(58) Field of Classification Search
CPC ... H04L 63/08; H04L 61/103; H04L 61/6009; H04L 63/083; H04L 63/10; H04L 63/101;
(Continued)

(56) References Cited

U.S. PATENT DOCUMENTS

2014/0359738 A1    12/2014    Nakajima

FOREIGN PATENT DOCUMENTS

| EP | 2809047 A2 | 12/2014 |
| JP | 2004-207820 A | 7/2004 |

(Continued)

OTHER PUBLICATIONS

COOVA (AP Location, May 16, 2010, 11 pages) (Year: 2010).*
Chen (A Proof of MITM Vulnerability in Public WLANs Guarded by Captive Portal, in Proceedings of the Asia-Pacific Advanced Network, vol. 30, 2010, 5 pages) (Year: 2010).*
Moussaoui (Building a Captive Portal—controlling access to the internet from your network, Jan. 15, 2013, 5 pages) (Year: 2013).*
Japanese Office Action issued by the Japan Patent Office for Japanese Application No. 2017-508142 dated May 1, 2018 (9 pages).
(Continued)

*Primary Examiner* — Oleg Korsak
(74) *Attorney, Agent, or Firm* — Wilmer Cutler Pickering Hale and Dorr LLP

(57) ABSTRACT

According to an exemplary embodiment, a communication management system has an access point that controls the connection of a terminal trying to connect through wireless communication, and a communication management device that manages a plurality of said access points are connected to each other via a network.

10 Claims, 8 Drawing Sheets

(51) Int. Cl.
*H04W 76/10* (2018.01)
*H04W 12/08* (2009.01)
*H04W 48/08* (2009.01)
*H04L 29/12* (2006.01)
*H04W 84/12* (2009.01)
*H04W 88/08* (2009.01)

(52) U.S. Cl.
CPC ............ *H04L 63/083* (2013.01); *H04L 63/10* (2013.01); *H04L 63/101* (2013.01); *H04L 63/20* (2013.01); *H04W 12/06* (2013.01); *H04W 12/08* (2013.01); *H04W 48/08* (2013.01); *H04W 76/10* (2018.02); *H04L 61/2007* (2013.01); *H04L 61/6022* (2013.01); *H04W 84/12* (2013.01); *H04W 88/08* (2013.01)

(58) Field of Classification Search
CPC ...... H04L 63/20; H04W 76/10; H04W 12/06; H04W 12/08; H04W 48/08
See application file for complete search history.

(56) References Cited

FOREIGN PATENT DOCUMENTS

| | | |
|---|---|---|
| JP | 2005-524161 A | 8/2005 |
| JP | 2009-100064 A | 5/2009 |
| JP | 2014-160942 A | 9/2014 |
| JP | 2014-235439 A | 12/2014 |
| JP | 2015-156639 A | 8/2015 |

OTHER PUBLICATIONS

International Search Report corresponding to PCT/JP2016/056372 dated May 10, 2016 (one page).

Japanese Notice of Reasons for Refusal issued in Japanese Patent Application No. 2017-508142, dated Sep. 3, 2019, 4 pages.

* cited by examiner

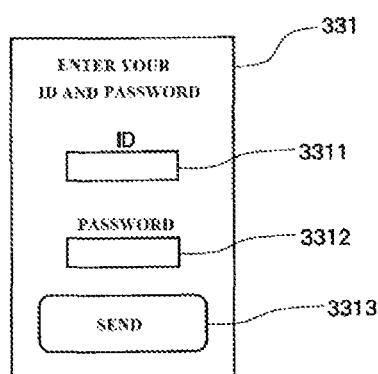

| SOURCE IP ADDRESS 361 | SOURCE PORT NUMBER 362 | AP'S MAC ADDRESS 363 | TERMINAL'S MAC ADDRESS 364 | PROCESS ID 365 |
|---|---|---|---|---|
| aaa.bbb.ccc.1 | 12345 | 00:11:22:33:44:55 | 11:22:33:44:55:66 | 6789 |
| aaa.bbb.ccc.2 | 12346 | 00:11:22:33:44:56 | 11:22:33:44:55:67 | 6790 |
| ... | ... | ... | ... | ... |

| AP'S MAC ADDRESS 371 | AP'S IP ADDRESS 372 |
|---|---|
| 00:11:22:33:44:55 | xxx.yyy.zzz.1 |
| 00:11:22:33:44:56 | xxx.yyy.zzz.2 |

| PERMITTED TERMINAL'S IP ADDRESS 262 |
|---|
| 192. 168. 0. 2 |
| 192. 168. 0. 3 |
| ... |

FIG.11

| SOURCE IP ADDRESS 361 | SOURCE PORT NUMBER 362 | AP'S IP ADDRESS 363A | TERMINAL'S IP ADDRESS 364A | PROCESS ID 365 |
|---|---|---|---|---|
| aaa. bbb. ccc. 1 | 12345 | xxx. yyy. zzz. 1 | uuu. vvv. www. 1 | 6789 |
| aaa. bbb. ccc. 2 | 12346 | xxx. yyy. zzz. 2 | uuu. vvv. www. 2 | 6790 |
| ... | ... | ... | ... | ... |

FIG.12

COMMUNICATION MANAGEMENT SYSTEM, ACCESS POINT, COMMUNICATION MANAGEMENT DEVICE, CONNECTION CONTROL METHOD, COMMUNICATION MANAGEMENT METHOD, AND PROGRAM

CROSS-REFERENCE TO RELATED APPLICATIONS

This application is a national stage application of International Application No. PCT/JP2016/056372 entitled "Communication Management System, Access Point, Communication Management Device, Connection Control Method, Communication Management Method, and Program" filed on Mar. 2, 2016, which claims priority to Japanese Patent Application No. 2015-059488 filed on Mar. 23, 2015, the disclosures of which are hereby incorporated by reference in their entirety.

TECHNICAL FIELD

The present invention relates to a communication management system, an access point, a communication management device, a connection control method, a communication management method, and a program.

BACKGROUND ART

Public wireless LAN service has been recently known for connecting smartphones, tablets, and PCs to the Internet, using wireless LAN access points (hereinafter referred to as "AP") provided in train stations, cafes, and the like. A user who signs up with an Internet service provider (hereinafter referred to as "ISP"), a mobile-service provider, or the like can use public wireless LAN service by entering his/her ID and password, which are issued by the ISP or mobile-service provider, in a login window. Here, the AP provider demands an AP service fee from the ISP, mobile-service provider, or the like and issues the ID, on the basis of the user's usage record.

In addition, apparatuses called wireless LAN controllers (hereinafter referred to as "WLC") have been typically used to collectively manage a large number of APs used for public wireless LAN service and the like. This apparatus has, in addition to the function of collectively performing setting for the large number of APs, a function of collectively configuring settings for a large number of APs and a function of intensively performing authentication and access control using IDs, passwords, and the like, for terminals requesting connection to APs. Patent Literature 1 discloses a technique related to a public wireless LAN using such APs.

CITATION LIST

Patent Literature

Patent Literature 1: JP2005-524161A

SUMMARY OF INVENTION

Technical Problem

However, the conventional technique disclosed in Patent Literature 1, for example, involves heavy communication traffic due to concentration of communication traffic from a plurality of terminals, trying to use the Internet via an AP, to a WLC serving as a management node, thus causing a problem of a reduction in communication speed.

It is an object of the present invention, which has been made in view of this background, to prevent concentration of communication traffic to a management node and to avoid a reduction in communication speed.

Solution to Problem

To solve this problem, in a communication management system of the present invention, an access point that controls the connection of a terminal trying to connect through wireless communication, and a communication management device that manages a plurality of said access points are connected to each other via a network. Said access point includes: permitted terminal information storage means that stores permitted terminal information for specifying a permitted terminal permitted to communicate with the network; access information generating means that generates access information when connection request terminal information for specifying a connection request terminal requesting a connection to the network through wireless communication is not stored as the permitted terminal information in said permitted terminal information storage means, by adding the connection request terminal information and access point information for specifying the access point to information used for accessing provider information that provides an authentication window through which connection authentication information allowing the connection request terminal to connect to the network is input; access information transmitting means that transmits access information generated by said access information generating means to the connection request terminal; and permission information receiving means that receives the permitted terminal information from said communication management device. Said communication management device includes: communication means that transmits the provider information to the connection request terminal and receives, from the connection request terminal, the connection authentication information input to the authentication window provided according to the provider information, when the connection request terminal tries to connect to the network according to the access information; terminal information storage means that stores the connection request terminal information and the access point information contained in the access information; authentication means that authenticates the connection request terminal, according to the connection authentication information received by said communication means; and permitted terminal information transmitting means that transmits, when said authentication means authenticates the connection request terminal, permitted terminal information, permitting the connection request terminal to communicate with the network, together with the connection request terminal information to the access point specified by the access point information stored in said terminal information storage means.

Advantageous Effect of Invention

The present invention can prevent concentration of communication traffic to a management node and avoid a reduction in communication speed.

BRIEF DESCRIPTION OF DRAWINGS

FIG. 2 is a schematic view showing an example of addresses stored in control table 26 according to the first embodiment of the present invention.

FIG. 3 is a schematic view showing an example of addresses stored in ARP table 27 according to the first embodiment of the present invention.

FIG. 4 is a schematic view showing an example of an authentication Web page according to one embodiment of the present invention.

FIG. 11 is a schematic view showing an example of IP addresses stored in control table 26A according to the second embodiment of the present invention.

FIG. 12 is a schematic view showing an example of records stored in session table 36A according to the second embodiment of the present invention.

DESCRIPTION OF EXEMPLARY EMBODIMENTS

Figure 1:
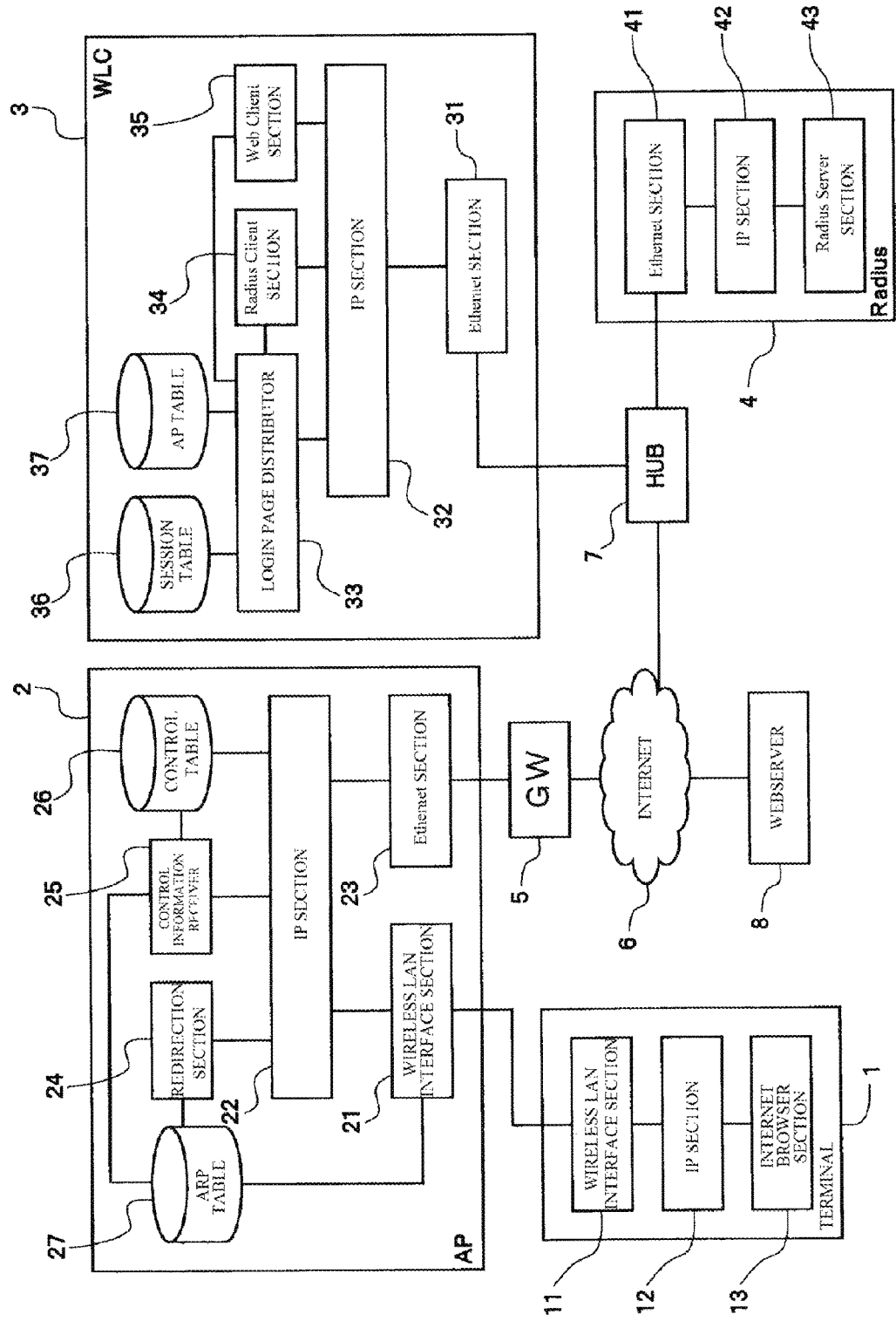
FIG. 1 is a schematic configuration diagram of a communication management system according to a first embodiment of the present invention.

A communication management system according to an exemplary embodiment of the present invention will now be described with reference to the drawings. It should be noted that in the drawings, the same or corresponding components are denoted by the same reference numeral and overlapping description will be omitted as appropriate for simplification.

First Exemplary Embodiment

The configuration of a communication management system according to a first exemplary embodiment of the present invention will now be briefly described with reference to FIG. 1. Terminal 1, AP 2, WLC 3, and Radius 4 in the communication management system of this exemplary embodiment are connected to each other via a network.

Terminal 1 is a communication terminal, represented by a personal computer or a smartphone, and includes wireless LAN interface section 11, IP section 12, and Internet browser section 13. Although FIG. 1 shows only one terminal 1 for convenience of representation in the drawing, it is natural that there may be two or more terminals 1

AP 2 is, for example, a communication device represented by a wireless LAN access point and the like, and includes wireless LAN interface section 21 (in FIG. 1, shown as "wireless LAN I/F" for convenience of representation), IP section 22, Ethernet (registered trademark) section 23, redirection section 24, control information receiver 25, control table 26, and ARP table 27. Although FIG. 1 shows only one AP 2, like terminal 1, for convenience of representation in the drawing, the drawing, it is natural that there may be two or more APs 2.

WLC 3 is a device for central management of a plurality of APs 2 and, in this exemplary embodiment, is also referred to as a communication management device. WLC 3 includes Ethernet (registered trademark) section 31, IP section 32, login page distributor 33, Radius Client section 34, Web Client section 35, session table 36, and AP table 37.

Radius 4 is an authentication device that performs authentication using a Radius protocol and includes Ethernet (registered trademark) section 41, IP section 42, and Radius Server section 43.

Wireless LAN interface section 11 in terminal 1 has the following functions.

[Frame Transmission Function]

Upon receipt of an IP packet and the most logical next hop IP address from IP section 12, wireless LAN interface section 11 uses the received most logical next hop IP address to issue a MAC address request to the ARP table.

Next, wireless LAN interface section 11 acquires the most logical MAC address corresponding to the acquired most logical next hop IP address. Subsequently, the header of an Ethernet (registered trademark) protocol in which the acquired most logical MAC address is the destination MAC address and the MAC address of wireless LAN interface section 11 is the source MAC address is added to the IP packet received from IP section 12. Thus, an Ethernet (registered trademark) frame is generated and the Ethernet frame is transmitted to the destination MAC address of the Ethernet frame.

Upon receipt of the Ethernet frame from wireless LAN interface section 21 of AP 2, wireless LAN interface section 11 refers to the destination MAC address of the Ethernet frame. If the referred destination MAC address matches the MAC address of wireless LAN interface section 11, it is recognized as a frame that is to be transmitted to wireless LAN interface section 11, the header of the Ethernet protocol is removed, and the generated IP packet is transmitted to IP section 12. On the contrary, if the referred destination MAC address does not match the MAC address of wireless LAN interface section 11, it is recognized as a frame that is not transmitted to wireless LAN interface section 11 and the received frame is dropped.

[ARP Table Function]

Wireless LAN interface section 11 has a function of ensuring that the MAC address of a machine in the same LAN segment as terminal 1 corresponds to the IP address which is held in the memory of terminal 1, as an address resolution protocol (ARP) table.

[ARP Table Management Function]

Wireless LAN interface section 11 has a function of additionally registering, upon communication with a MAC address that is not registered in the ARP table, a corresponding relationship between the MAC address and the IP address to the ARP table. In addition, wireless LAN interface section 11 removes the entries of MAC addresses and IP addresses out of communication for a given time after their registrations to the ARP table, from the ARP table.

IP section 12 generates an IP packet by adding the header of an IP protocol to a destination IP address and data received from Internet browser section 13. At this time, the destination IP address is set to an address received from Internet browser section 13, and the source IP address is set to an IP address that is set to wireless LAN interface section 11 of terminal 1.

Subsequently, IP section 12 refers to the destination IP address of the IP packet, verifies it against a routing table held in IP section 12, and acquires the most logical next hop IP address as the next hop of the IP packet. The generated IP packet and the most logical next hop IP address are sent to the Ethernet section having the most logical accessibility to the matching destination IP address to allow for transmission. Since terminal 1 includes only one Ethernet section, IP section 12 sends the IP packet to wireless LAN interface section 11.

Similarly, upon receipt of the IP packet from wireless LAN interface section 11, IP section 12 checks the destination IP address of the IP header. If the checked destination IP address of the IP header matches the IP address of wireless LAN interface section 11 of terminal 1, IP section 12 removes the header of the IP packet received from wireless LAN interface section 11, refers to a port number contained in the generated data, and sends the data to an application corresponding to the port number. It should be noted that in terminal 1, IP section 12 sends the data to Internet browser section 13.

Internet browser section 13 is an application for browsing common Web pages and communicates with the webserver of the URL, specified by the operator of terminal 1, through IP section 12. To send data to IP section 12, a DNS resolver function in Internet browser section 13 resolves the destination IP address corresponding to the destination URL so that the destination IP address and the data can be sent to IP section 12.

Wireless LAN interface section 21 of AP 2 has functions similar to the frame transmission function and ARP table management function of wireless LAN interface section 11 of terminal 1. Wireless LAN interface section 21 adds and removes the entries that corresponding to a MAC address and an IP address to/from ARP table 27 while executing the ARP table management function. Wireless LAN interface section 21 functions as an access information transmitting means described below for transmitting a redirect URL that serves as access information to terminal 1.

Figure 8:
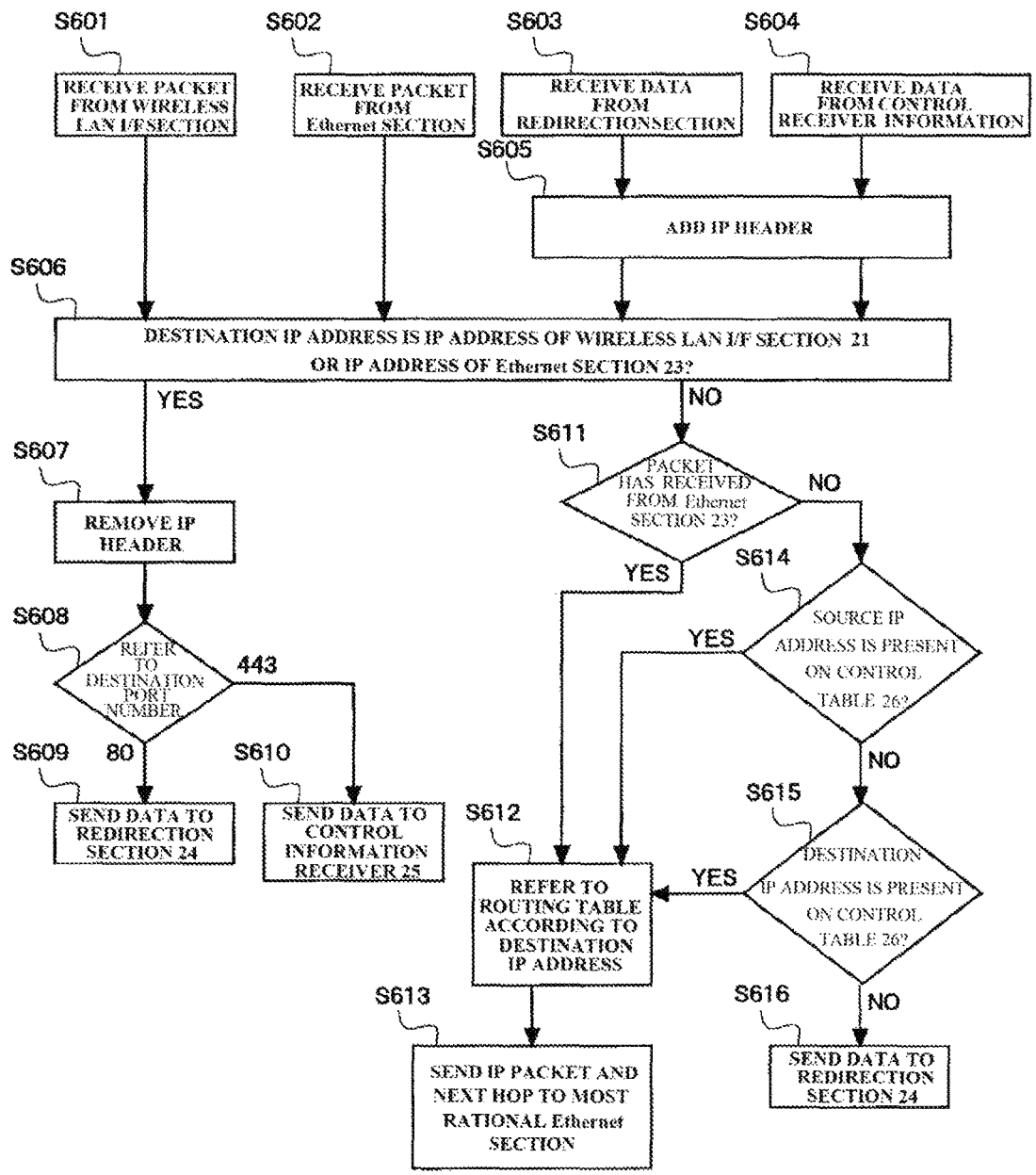
FIG. 8 is a flow chart showing an operation process in IP section 22 according to the first embodiment of the present invention.

IP section 22 of AP 2 determines the destination of a packet or data received from wireless LAN interface section 21, Ethernet section 23, redirection section 24, or control information receiver 25 by a process explained referring to FIG. 8, and transmits the packet or data to the determined destination.

Ethernet section 23 functions as a permission information receiving means that receives permitted terminal information from WLC 3 and also has the following functions.

[Frame Transmission Function]

Upon receipt of an IP packet and the most logical next hop IP address from IP section 22, Ethernet section 23 uses the received most logical next hop IP address to issue a MAC address request to ARP table 27. The most logical MAC address corresponding to the acquired most logical next hop IP address is then acquired.

Ethernet section 23 generates an Ethernet frame by adding the header of an Ethernet protocol in which the acquired most logical MAC address is the destination MAC address and the MAC address of Ethernet section 23 is the source MAC address, to the IP packet received from IP section 22, and transmits the Ethernet frame to the destination MAC address of the Ethernet frame.

Upon receipt of an Ethernet frame from Gateway (hereinafter referred to as "GW") 5 serving as a relay between Internet 6 and AP 2, Ethernet section 23 refers to the destination MAC address of the Ethernet frame. If the referred destination MAC address matches the MAC address of Ethernet section 23, it is recognized as a frame that is to be transmitted to Ethernet section 23, the header of the Ethernet protocol is removed, and the generated IP packet is transmitted to IP section 22. On the contrary, if the referred destination MAC address does not match the MAC address of Ethernet section 23, Ethernet section 23 recognizes it as a frame that is not to be not transmitted to Ethernet section 23 and drops the received frame.

[ARP Table Function]

Ethernet section 23 has a function of holding correspondences, held in the memory of AP 2, between the MAC addresses of machines communicating with AP 2 and the IP addresses, as an ARP table.

[ARP Table Management Function]

Ethernet section 23 has a function of additionally registering, upon communication with a MAC address that is not registered in the ARP table, a correspondence relation between the MAC address and the IP address. In addition, Ethernet section 23 removes the entries of MAC addresses and IP addresses out of communication for a given time after their registrations to the ARP table, from the table.

Redirection section 24 is an access information generating means for generating access information (a redirect URL) generated by adding connection request terminal information and access point information, which specifies an access point, to information (e.g., a URL) to access to provider information (e.g., a website) that provides an authentication window to input authentication information for connecting the terminal to the network, when connection request terminal information, that specifies a terminal to issue a connection request to a network through wireless communication, is not stored in control table 26 as permitted terminal information. Redirection section 24 has a function of generating a redirect URL to be transmitted to terminal 1 and giving a notification. Upon receipt of data from IP section 22, if the data is http, redirection section 24 transmits a MAC address request having the IP address of terminal 1, contained in the received http data, as a key to ARP table 27. Accordingly, redirection section 24 acquires the corresponding MAC address from ARP table 27.

Subsequently, redirection section 24 generates, for the URL of the login page of login page distributor 33 of WLC 3, http data of a redirect request to which the MAC address of Ethernet section 23 and the MAC address acquired from ARP table 27 are added, and sends it to IP section 22. It should be noted that the MAC address of Ethernet section 23 is preliminarily stored in a built-in memory in redirection section 24.

For example, if the IP address assigned to wireless LAN interface section 11 of terminal 1 is "192.168.0.11", the MAC address assigned to wireless LAN interface section 11 of terminal 1 is "00:00:00:00:00:11", the IP address assigned to Ethernet section 23 is "133.0.0.23", and the MAC address assigned to Ethernet section 23 is "00:00:00:00:00:23", redirection section 24 uses the IP address "192.168.0.11" contained in the received http data as a key and transmits the MAC address request to ARP table 27.

Subsequently, redirection section 24 acquires a MAC address reply containing the corresponding MAC address "00:00:00:00:00:11". Redirection section 24 then sends IP section 22 http data of the redirect request containing the URL "https://133.0.0.31/login?ap_mac=00-00-00-00-00-23&src_mac=00-00-00-00-00-11" that is obtained by adding the MAC address of Ethernet section 23 "00:00:00:00:00:23" and the MAC address "00:00:00:00:00:11" acquired from ARP table 27 to the URL of the login page of login page distributor 33 of WLC 3 "https://133.0.0.31/login?".

Control information receiver 25 receives data with https from Web Client section 35 of WLC 3 via IP section 22, sends the MAC address contained in the received data to ARP table 27, and acquires the corresponding IP address form ARP table 27. Control information receiver 25 then sends the received MAC address and acquired IP address to control table 26.

After data is sent to control table 26, control information receiver 25 generates data of a response message with https, which indicates reception of data of the MAC address corresponding to the IP address of Ethernet section 23, and transmits https data to Web Client section 35 of WLC 3 via IP section 22.

Control table 26 serves as a permitted terminal information storage means that stores permitted terminal information for specifying permitted terminals which are permitted to communicate with the network. In other words, control table 26 is a table to store addresses that correspond relation between the MAC addresses of terminals permitted to communicate and the permitted IP addresses. Upon receipt of a MAC address and an IP address from control information receiver 25, control table 26 adds the received MAC address and IP address to control table 26.

Further, upon receipt of a request for reference to permitted terminal's IP address 262 from IP section 22, control table 26 uses the IP address contained in the reference request to search permitted terminal's IP address 262.

When the IP address contained in the reference request is included in permitted terminal's IP address 262, control table 26 sends a reference response, which contains the message that the IP address contained in the reference request is present in permitted terminal's IP address 262, to IP section 22. On the contrary, when the IP address contained in the reference request is not included in permitted terminal's IP address 262, control table 26 sends a reference response, which contains the message that the IP address contained in the reference request is absent in permitted terminal's IP address 262, to IP section 22.

ARP table 27 has functions similar to those of wireless LAN interface section 11 of terminal 1 and operates in a manner similar to wireless LAN interface section 11 and its description will be therefore omitted.

Ethernet section 31 of WLC 3 operates in a manner similar to Ethernet section 23 of AP 2. Further, IP section 32 of WLC 3 operates in a manner similar to IP section 12 of terminal 1 and its description will be therefore omitted.

When a connection request terminal tries to connect to the network according to access information, login page distributor 33 functions as a communication means that transmits a URL and the like regarded as provider information to the connection request terminal, and receives, from the connection request terminal, connection authentication information including a login ID and a password entered on an authentication window which is provided based on provider information. To be specific, login page distributor 33 has the following functions.

[Web Page Distributing Function]

Upon receipt of a Web page request with https from terminal 1, login page distributor 33 temporarily stores the MAC address of Ethernet section 23 of AP 2 and the MAC address of wireless LAN interface section 11 of terminal 1 contained in the URL in the request in the received https data, in the storage area of login page distributor 33.

Afterwards, login page distributor 33 transmits https data of the Web page serving as an https authentication window to Internet browser section 13 of terminal 1 through IP section 22.

Upon receipt of https data containing the ID and password used for authentication, login page distributor 33 transmits the received ID and password to Radius Client section 34. At this time, upon startup of Radius Client section 34, a process ID is issued.

After transmitting the ID and the password to Radius Client section 34, login page distributor 33 transmits, to session table 36, record data consisting of a source IP address obtained upon receipt of https data, a source port number, the MAC address of Ethernet section 23 of AP 2 and the MAC address of wireless LAN interface section 11 of terminal 1 temporarily stored in the storage area of login page distributor 33, and a process ID issued when data is transmitted to Radius Client section 34.

[Function of Notifying Terminal Information to AP 2]

Upon receipt of authentication results from Radius Client section 34, login page distributor 33 searches session table 36 by using the process ID of Radius Client section 34, from which authentication results have been transmitted, as a key. Subsequently, login page distributor 33 acquires the source IP address, the source port number, the MAC address of Ethernet section 23 of AP 2, and the MAC address of wireless LAN interface section 11 of terminal 1 obtained upon receipt of the data, as the corresponding record, and temporarily stores them in the storage area of login page distributor 33.

Afterwards, login page distributor 33 sends the MAC address of Ethernet section 23 of AP 2 temporarily stored in the storage area of login page distributor 33 to AP table 37 and acquires the IP address of Ethernet section 23 of AP 2. Login page distributor 33 then sends the acquired IP address of Ethernet section 23 of AP 2 and the MAC address of wireless LAN interface section 11 of terminal 1 to Web Client section 35.

[Function of Finalizing Terminal Information Notification]

Upon receipt from Web Client section 35 of a notification of the completion of data transmission of the MAC address of wireless LAN interface section 11 of terminal 1 to the IP address of Ethernet section 23 of AP 2, login page distributor 33 transmits, to session table 36, a request for record removal using the MAC address of wireless LAN interface section 11 of terminal 1 as a key, and the record related to the request for the removal is removed. Afterwards, login page distributor 33 transmits data of the Web page showing the success of authentication in the form of https to Internet browser section 13 of terminal 1 via IP section 32.

Radius Client section 34 serving as an authentication means requests Radius Server section 43 of Radius 4 via IP section 32 to authenticate the ID and password transmitted from login page distributor 33. Here, the IP address of Radius Server section 43 is preliminarily stored in the storage area of Radius Client section 34.

Further, when receiving the authentication results from Radius Server section 43 via IP section 32, Radius Client section 34 transmits the authentication results received from Radius Server section 43, to login page distributor 33.

When Radius 4 authenticates the terminal related to the connection request, Web Client section 35 functions as a permitted terminal information transmitting means that transmits permitted terminal information with information about the terminal related to the connection request. The permitted terminal information permits communication between the Internet 6 and the terminal related to the connection request given to the access point specified by access point information stored in AP table 37 serving as a terminal information storage means. Upon receipt of the MAC address of wireless LAN interface section 11 of terminal 1 and the IP address of AP 2 from login page distributor 33, Web Client section 35 provides the notification, the destination of which is the IP address of AP 2, of the MAC address of wireless LAN interface section 11 of terminal 1 in the form of https, to control information receiver 25 of AP 2.

After receiving an https response message telling that the transmission of data of the MAC address of wireless LAN interface section 11 of terminal 1 to the IP address of Ethernet section 23 of AP 2 has been completed, from control information receiver 25 via IP section 32, Web Client section 35 transmits a message notifying that the transmission of data of the MAC address of wireless LAN interface section 11 to the IP address of Ethernet section 23 has been completed, to login page distributor 33.

Session table 36 is a table that stores record data showing a correspondence between the source IP address of the terminal related to the authentication request, the source port number of the terminal related to the authentication request, the MAC address of the AP to which the terminal related to the authentication request belongs, the MAC address of the terminal related to the authentication request, and the process ID issued when login page distributor 33 sends the ID and password related to the authentication request to Radius Client section 34.

Session table 36 does not store data in the initial system operation state.

Upon addition of data, session table 36 receiving a request for addition of an element from login page distributor 33 adds the entry using the process ID as a key.

Upon reference to data, session table 36 receiving the process ID from login page distributor 33 as a research key returns the data of the corresponding entry to login page distributor 33.

Upon deletion of data, session table 36 receiving a request for deletion of an element from login page distributor 33 deletes the record using the receiving process ID as a key from session table 36.

AP table 37 is a table to which the IP address of the AP corresponding to the MAC address of the AP is written. Upon receipt of the MAC address of the AP from login page distributor 33 as a research key, AP table 37 returns the IP address of the AP to login page distributor 33.

Ethernet section 41 of Radius 4 operates in a manner similar to Ethernet section 23 of AP 2 and its description will be therefore omitted. Further, IP section 42 operates in a manner similar to IP section 12 of terminal 1 and its description will be therefore omitted.

Radius Server section 43 performs comparison between the ID and password contained in an authentication request received from Radius Client section 34 of WLC 3 through IP section 42, and the ID and password stored in Radius Server section 43. If they match, Radius Server section 43 sends back a message indicating the success of authentication to Radius Client section 35 through IP section 42. If they do not match, Radius Server section 43 sends back a message indicating the failure of authentication to Radius Client section 35 through IP section 42.

Control table 26 shown in FIG. 1 will now be described with reference to FIG. 2. Control table 26 includes permitted terminal's MAC address 261 and permitted terminal's IP address 262. Permitted terminal's MAC address 261 has the MAC address of, among terminals belonging to AP 2, the terminal permitted to communicate with an external device. Permitted terminal's IP address 262 has the IP address of, among terminals belonging to AP 2, the terminal permitted to communicate with an external device.

Here, for example, permitted terminal's MAC address 261 "aa:bb:cc:dd:ee:ff" is associated with permitted terminal's IP address 262 "192.168.0.2", and permitted terminal's MAC address 261 "aa:bb:cc:dd:ef:00" is associated with permitted terminal's IP address 262 "192.168.0.3".

ARP table 27 shown in FIG. 1 will now be described with reference to FIG. 3. ARP table 27 includes terminal's MAC address 271 and terminal's IP address 272. Terminal's MAC address 271 stores the MAC address of the terminal that has communicated with the wireless LAN interface section 21 of AP 2 in a past certain period. Terminal's IP address 272 stores the IP address of the terminal that has communicated with the wireless LAN interface section 21 of AP 2 in a past certain period.

Here, for example, terminal's MAC address 271 "aa:bb:cc:dd:ee:ff" is associated with terminal's IP address 272 "192.168.0.2", and terminal's MAC address 271 "aa:bb:cc:dd:ef:00" is associated with terminal's IP address 272 "192.168.0.3".

Authentication Web page 331 which is an example of an authentication Web page transmitted from login page distributor 33 shown in FIG. 1 to terminal 1 will now be described with reference to FIG. 4. Here, authentication Web page 331 consists of textbox 3311 to enter an ID, textbox 3312 to enter a password, and send button 3313 that enables an operation to transmit the input ID and password to login page distributor 33.

Figures 5, 6, 7:
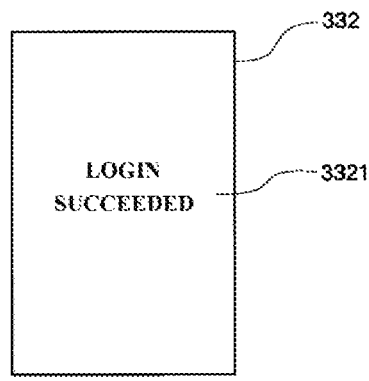
FIG. 5 is a schematic view showing an example of an authentication results Web page according to one embodiment of the present invention.
FIG. 6 is a schematic view showing an example of records stored in session table 36 according to the first embodiment of the present invention.
FIG. 7 is a schematic view showing an example of addresses stored in AP table 37 according to the first embodiment of the present invention.

Authentication results Web page 332 which is a display example of authentication results transmitted from login page distributor 33 to terminal 1 to notify the success of authentication will now be described with reference to FIG. 5. Here, "login succeeded." is displayed on authentication results Web page 332 as message 3321.

Session table 36 shown in FIG. 1 will now be described with reference to FIG. 6. Session table 36 includes source IP address 361, source port number 362, AP's MAC address 363, terminal's MAC address 364, and process ID 365.

Source IP address 361 has the source IP address of a terminal related to an authentication request. Source port number 362 stores the source port number of a terminal related to an authentication request. AP's MAC address 363 stores the MAC address of the AP to which a terminal related to an authentication request belongs. Terminal's MAC address 364 stores the MAC address of the terminal related to the authentication request. Further, process ID 365 stores the process ID issued from the OS in WLC 3 when login page distributor 33 sends the ID and the password, which are related to the authentication request, to Radius Client section 34.

Here, for example, source IP address 361 "aaa:bbb:ccc:1", source port number 362 "12345", AP's MAC address 363 "00:11:22:33:44:55", terminal's MAC address 364 "11:22:33:44:55:66", and process ID 365 "6789" are associated with each other. Further, source IP address 361 "aaa:bbb:ccc:2", source port number 362 "12346", AP's MAC address 363 "00:11:22:33:44:56", terminal's MAC address 364 "11:22:33:44:55:67", and process ID 365 "6790" are associated with each other.

AP table 37 shown in FIG. 1 will now be described with reference to FIG. 7. AP table 37 stores the MAC address of an AP and the IP address of the AP required when Web Client section 35 of WLC 3 notifies the AP of the IP address of a terminal that has been succeeded in authentication, and consists of AP's MAC address 371 and corresponding AP's IP address 372.

Here, for example, AP's MAC address 371 "00:11:22:33: 44:55" is associated with AP's IP address 372 "xxx.yyy.zzz.1", and AP's MAC address 371 "00:11:22:33: 44:56" is associated with AP's IP address 372 "xxx.yyy.zzz.2".

The operation flow of IP section 22 shown in FIG. 1 will now be described with reference to FIG. 8. Upon receipt of a packet from wireless LAN interface section 21 (Step S601), upon receipt of a packet from Ethernet section 23 (Step S602), upon receipt of data from redirection section 24 (Step S603), or upon receipt of data from control information receiver 25 (Step S604), IP section 22 starts processing.

IP section 22 adds an IP header to data received from redirection section 24 or control information receiver 25 (Step S605).

Subsequently, IP section 22 checks if the destination IP address of the IP header is the IP address of wireless LAN interface section 21 of AP 2 or the IP address of Ethernet section 23 (Step 606).

If the destination IP address of the IP header is the IP address of wireless LAN interface section 21 of AP 2 or the IP address of Ethernet section 23 (Step 606, YES), IP section 22 removes the header of the IP packet (Step S607).

Afterwards, IP section 22 refers to the port number contained in the generated data (Step S608) and, if the destination port number is 80 (Step S608, port number 80), sends the data to redirection section 24 (Step S609). Meanwhile, if the transmission port number is 443 (Step S608, port number 443), IP section 22 sends the data to control information receiver 25 (Step S610).

On the contrary, if the destination IP address of the IP header is not the IP address of wireless LAN interface section 21 of AP 2 or the IP address of Ethernet section 23 (Step 606, NO), IP section 22 checks if the Ethernet section from which the packet has been received is Ethernet section 23 (Step S611).

If the Ethernet section from which the packet has been received is Ethernet section 23 (Step S611, YES), IP section 22 refers to the destination IP address of the IP packet, verifies it against a routing table held in IP section 22, and acquires the most logical next hop IP address as the next hop of the IP packet (Step S612). Subsequently, IP section 22 sends the generated IP packet and the most logical next hop IP address to the Ethernet section having the most logical accessibility to the matching destination IP address for allowing for transmission (Step S613).

On the contrary, if the Ethernet section from which the packet has been received is not Ethernet section 23 (Step S611, NO), IP section 22 refers to control table 26 using the source IP address of the IP header as a research key (Step S614).

If the source IP address of the IP header is present on control table 26 (Step S614, YES), IP section 22 executes above-described Step S612 and Step S613. On the contrary, if the source IP address of the IP header is absent on control table 26 (Step S614, NO), IP section 22 refers to control table 26 using the destination IP address of the IP header as a key (Step S615).

When the destination IP address of the IP header is present on control table 26 (Step S615, YES), IP section 22 executes Step S612 and Step S613. On the contrary, if the destination IP address of the IP header is absent on control table 26 (Step S615, NO), IP section 22 sends the packet to redirection section 24 (Step S616).

Figure 9:
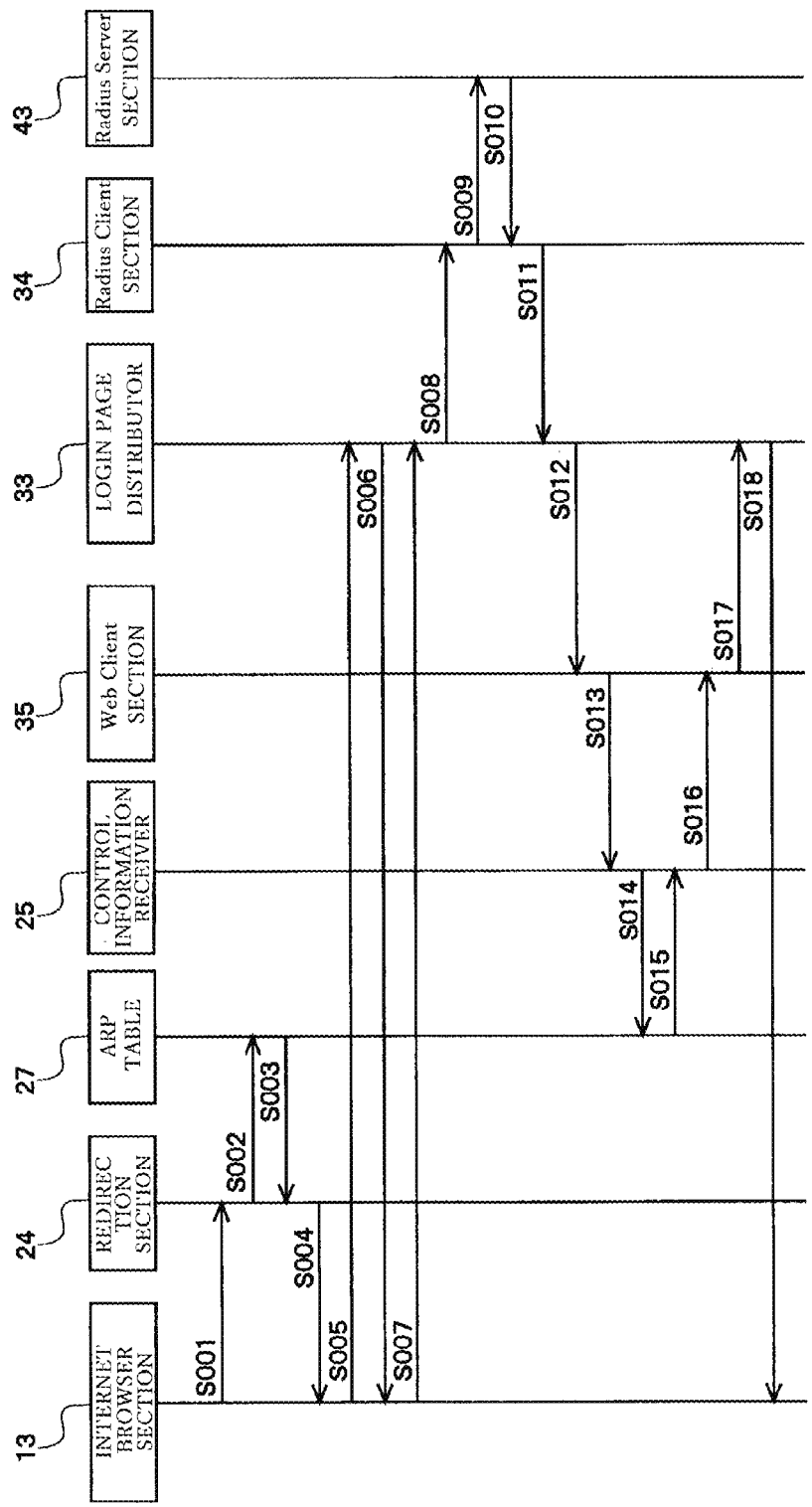
FIG. 9 is a diagram showing an operation sequence according to the first embodiment of the present invention.

The operation process of the communication management system according to the first exemplary embodiment will now be explained with reference to FIG. 9.

[Initial State]

The initial state before the start of this process will be described. Here, the user wirelessly connects terminal 1 to AP 2, and the MAC address of the Ethernet section of each device and the corresponding IP address are as follows.

The MAC address of wireless LAN interface section 11 of terminal 1 is "00:00:00:00:00:11", and the corresponding IP address is "192.168.0.11".

The MAC address of wireless LAN interface section 21 of AP 2 is "00:00:00:00:00:21", and the corresponding IP address is "192.168.0.21".

The MAC address of Ethernet section 23 of AP 2 is "00:00:00:00:00:23", and the corresponding IP address is "133.0.0.23".

The MAC address of Ethernet section 31 of WLC 3 is "00:00:00:00:00:31", and the corresponding IP address is "133.0.0.31".

The MAC address of Ethernet section 41 of Radius 4 is "00:00:00:00:00:41", and the corresponding IP address is "133.0.0.41".

The MAC address of the Ethernet section of GW 5 is "00:00:00:00:00:51", and the corresponding IP address is "133.0.0.51".

The port number designated for the application of each device is as below.

The port number of Internet browser section 13 of terminal 1 is "10013", the port number of redirection section 24 of AP 2 is "80", the port number of control information receiver 25 of AP 2 is "443", the port number of login page distributor 33 of WLC 3 is "443", the port number of Radius Client section 34 of WLC 3 is "30034", the port number of Web Client section 35 of WLC 3 is "30035", and the port number of Radius Server section 43 of Radius 4 is "1812".

In addition, the URL of webserver 8 and the IP address of a target page are as follows.

The URL of webserver 8 is "http://www.******.ne.jp/" and the IP address is "133.0.0.1".

The URL of login page distributor 33 of WLC 3 is "https://133.0.0.31/".

The user account registered to Radius 4 is as follows and the login ID is "user" and the password is "musen" here.

Further, in redirection section 24 of AP 2, the MAC address of Ethernet section 23 of AP 2 "00:00:00:00:00:23" is stored in the built-in memory of redirection section 24.

The following records are registered to control table 26 of AP 2.

In the registration, permitted terminal's MAC address 261 "00:00:00:00:00:21" is associated with permitted terminal's IP address 262 "192.168.0.21" and registered, permitted terminal's MAC address 261 "00:00:00:00:00:23" is associated with permitted terminal's IP address 262 "133.0.0.23" and registered, and permitted terminal's MAC address 261 "00:00:00:00:00:31" is associated with permitted terminal's IP address 262 "133.0.0.31" and registered.

The following records are registered to ARP table 27 of AP 2.

In the registration, terminal's MAC address 271 "00:00: 00:00:00:11" is associated with terminal's IP address 272 "192.168.0.11", and terminal's MAC address 271 "GW 5's MAC address" is associated with terminal's IP address 272 "GW 5's IP address". It should be noted that no record is registered to session table 36 of WLC 3.

Further, IP address "133.0.0.23" corresponding to the MAC address of Ethernet section 23 of AP 2 "00:00:00:00: 00:23" at installation of AP 2 is notified by AP 2 to AP table 37 of WLC 3 when the power of AP 2 is turned on, and the MAC address of AP 2 "00:00:00:00:00:23" and the IP address of AP 2 "133.0.0.23" are preliminarily registered to AP table 37.

[Before Authentication]

Sequence 001 indicating the operation of terminal 1 before authentication will now be described. First, when the user operates Internet browser section 13 of terminal 1 to access the Web page searched with the URL "http://www.\*\*\*\*\*\*.ne.jp/" in server 8, Internet browser section 13 of terminal 1 generates data of an access request for access to the URL "http://www.\*\*\*\*\*\*.ne.jp/" designated by the user. The DNS resolver function in Internet browser section 13 then resolves the destination IP address corresponding to the destination URL "http://www.\*\*\*\*\*\*.ne.jp/" and acquires the corresponding destination IP address "133.0.0.1". Subsequently, Internet browser section 13 sends the destination IP address "133.0.0.1" and http data to IP section 12.

Next, IP section 12 generates an IP packet by adding the header of an IP protocol in which "192.168.0.11" is set to the source IP address and the destination IP address "133.0.0.1" received from Internet browser section 13 is set to the destination IP address, to the data received from Internet browser section 13.

IP section 12 then refers to the destination IP address of the generated IP packet and verifies it against the routing table held in IP section 12. According to the results of the verification, IP section 12 determines that the Ethernet section having the most logical accessibility to the destination IP address is wireless LAN interface section 11 and the next hop IP address is "192.168.0.21", and sends an IP packet and the next hop IP address "192.168.0.21" to wireless LAN interface section 11 to allow for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21 of AP 2 which is wirelessly connected thereto.

Upon receipt of the frame from wireless LAN interface section 11 of terminal 1, wireless LAN interface section 21 of AP 2 refers to the destination MAC address of the Ethernet frame. Since the destination MAC address "00:00:00:00:00:21" of the Ethernet frame corresponds to the MAC address "00:00:00:00:00:21" of wireless LAN interface section 21, the header of the Ethernet protocol is removed and the generated IP packet is sent to IP section 22.

Upon receipt of the packet from wireless LAN interface section 21, IP section 22 checks if the destination IP address of the IP header corresponds to the IP address of wireless LAN interface section 21 of AP 2 or to the IP address of Ethernet section 23. According to the results, since the destination IP address "133.0.0.1" of the IP header does not correspond to the IP address "192.168.0.21" of wireless LAN interface section 21 of AP 2 or to the IP address "133.0.0.23" of Ethernet section 23, IP section 22 then checks if the Ethernet section from which the packet has been received is Ethernet section 23. According to the results, the Ethernet section does not correspond to Ethernet section 23 because the packet have been received from wireless LAN interface section 21. Accordingly, IP section 22 then checks if the source IP address "192.168.0.11" of the IP header is present on control table 26. According to the results, the source IP address "192.168.0.11" of the IP header is absent on control table 26, so that IP section 22 then checks if the destination IP address "133.0.0.1" of the IP header is present on control table 26. According to the results, the destination IP address "133.0.0.1" of the IP header is absent on control table 26, and IP section 22 therefore removes the header of the IP packet and transmits data to redirection section 24.

Subsequently, in sequence S002, since the data received from IP section 22 is http, redirection section 24 transmits a request for a MAC address containing the IP address "192.168.0.11" of the requestor of http, to ARP table 27.

Subsequently, in sequence S003, redirection section 24 acquires, from ARP table 27, a MAC address reply containing a MAC address "00:00:00:00:00:11" corresponding to the IP address "192.168.0.11".

Afterwards, in sequence S004, redirection section 24 sends IP section 22 http data of the redirect request the redirect destination address of which is the URL "https://133.0.0.31/login?ap_mac=00-00-00-00-00-23&src_mac=00-00-00-00-00-11" that is obtained by adding the MAC address of Ethernet section 23 of AP 2 "00:00:00:00:00:23" stored in the built-in memory and the MAC address "00:00:00:00:00:11" acquired from ARP table 27 to the URL of the login page of login page distributor 33 of WLC 3 "https://133.0.0.31/".

IP section 22 adds an IP header in which the source IP address is "192.168.0.21" and the destination IP address is "192.168.0.11" to data sent from redirection section 24. Subsequently, IP section 22 checks if the destination IP address "192.168.0.11" of the IP header is the IP address of wireless LAN interface section 21 of AP 2 or the IP address of Ethernet section 23. According to the results, since the destination IP address "192.168.0.11" of the IP header does not correspond to the IP address "192.168.0.21" of wireless LAN interface section 21 of AP 2 or to the IP address "133.0.0.23" of Ethernet section 23, IP section 22 then checks if the Ethernet section from which the packet has been received next is Ethernet section 23. According to the results, the Ethernet section does not correspond to Ethernet section 23 because the packet has been received from redirection section 24. Accordingly, IP section 22 then refers to control table 26 by using the source IP address "192.168.0.21" of the IP header as a research key and checks if the source IP address "192.168.0.21" is present on control table 26. According to the results, the source IP address "192.168.0.21" is present on control table 26 and IP section 22 refers to the destination IP address "192.168.0.11" of the IP packet, verifies it against a routing table held in IP section 22, and acquires the IP address "192.168.0.11" as the most logical next hop IP address as the next hop of the IP packet. Subsequently, the generated IP packet and the most logical next hop IP address "192.168.0.11" are sent to wireless LAN interface section 21 having the most logical accessibility to the matching destination IP address "192.168.0.11", to allow for transmission.

Wireless LAN interface section 21 receives the IP packet and the next hop IP address "192.168.0.11" from IP section 22 and sends a MAC address request to ARP table 27 with the next hop IP address "192.168.0.11", thereby obtaining the corresponding MAC address "00:00:00:00:00:11" for the next hop IP address "192.168.0.11". Subsequently, wireless LAN interface section 21 generates an Ethernet frame by adding the header of an Ethernet protocol in which the source MAC address is "00:00:00:00:00:21" and the destination MAC address is "00:00:00:00:00:11", and transmits the Ethernet frame to wireless LAN interface section 11 of terminal 1 which is wirelessly connected thereto.

Upon receipt of the frame from wireless LAN interface section 21 of AP 2, wireless LAN interface section 11 of terminal 1 refers to the destination MAC address "00:00:00:00:00:11" of the Ethernet frame. Since the destination MAC address "00:00:00:00:00:11" of the Ethernet frame corresponds to the MAC address "00:00:00:00:00:11" of wireless LAN interface section 11, the header of the Ethernet protocol is removed and the generated IP packet is sent to IP section 12.

IP section 12 checks whether the destination IP address in the IP header of the IP packet received from wireless LAN interface section 11 corresponds with the IP address "192.168.0.11" of wireless LAN interface section 11 of terminal 1. According to the results, the destination IP address "192.168.0.11" of the IP header corresponds to the IP address "192.168.0.11" of wireless LAN interface section 11 of terminal 1 and the IP header is therefore removed and the destination port number in the generated data is referred. Since the application corresponding to the destination port number "80" is Internet browser section 13, IP section 12 sends data to Internet browser section 13.

Subsequently, in sequence S005, Internet browser section 13 acquires the URL "https://133.0.0.31/login?ap_mac=00-00-00-00-00-23&src_mac=00-00-00-00-00-11" of the redirect destination address contained in the redirect request of http data received from IP section 12. To access there, Internet browser section 13 then generates https data of a request for accessing the URL "https://133.0.0.31/login?ap_mac=00-00-00-00-00-23&src_mac=00-00-00-00-00-11" of the redirect destination address and sends the data to IP section 12.

IP section 12 generates an IP packet by adding the header of an IP protocol in which "192.168.0.11" is set to the source IP address and "133.0.0.31" is set to the destination IP address, to the data received from Internet browser section 13.

IP section 12 refers to the destination IP address of the generated IP packet and verifies it against the routing table held in IP section 12. According to the results of the verification, IP section 12 determines that the Ethernet section having the most logical accessibility to the destination IP address "133.0.0.31" is wireless LAN interface section 11 and the next hop IP address is "192.168.0.21", and sends an IP packet and the next hop IP address "192.168.0.21" to wireless LAN interface section 11, for allowing for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21 of AP 2 which is wirelessly connected thereto.

Upon receipt of the frame from wireless LAN interface section 11 of terminal 1, wireless LAN interface section 21 of AP 2 refers to the destination MAC address of the Ethernet frame. Since the destination MAC address of the Ethernet frame "00:00:00:00:00:21" corresponds to the MAC address of wireless LAN interface section 21 "00:00:00:00:00:21", wireless LAN interface section 21 removes the header of the Ethernet protocol and sends the generated IP packet to IP section 22.

Upon receipt of the packet from wireless LAN interface section 21, IP section 22 checks if the destination IP address of the IP header corresponds to the IP address of wireless LAN interface section 21 of AP 2 or the IP address of Ethernet section 23. According to the results, the destination IP address "133.0.0.31" of the IP header does not correspond to the IP address of wireless LAN interface section 21 of AP 2 "192.168.0.21" or the IP address of Ethernet section 23 "133.0.0.23", so that IP section 22 checks if the Ethernet section from which the packet has been received is Ethernet section 23. According to the results, the Ethernet section does not correspond to Ethernet section 23 because the packet has been received from wireless LAN interface section 21. Accordingly, IP section 22 then checks if the source IP address of the IP header "192.168.0.11" is present on control table 26. According to the results, the source IP address "192.168.0.11" of the IP header is absent on control table 26, so that IP section 22 then checks if the destination IP address "133.0.0.31" of the IP header is present on control table 26. According to the results, the destination IP address "133.0.0.31" of the IP header is present on control table 26, so that IP section 22 refers to the destination IP address of the IP header and verifies it against the routing table held in IP section 22. According to the results of the verification, IP section 22 determines that the Ethernet section having the most logical accessibility to the destination IP address is Ethernet section 23 and the next hop IP address is "133.0.0.51", and sends an IP packet and the next hop IP address "133.0.0.51" to Ethernet section 23, for allowing for transmission.

Ethernet section 23 receives the IP packet and the next hop IP address "133.0.0.51" from IP section 22 and sends a MAC address request to the ARP table in Ethernet section 23 with the next hop IP address "133.0.0.51", thereby obtaining the MAC address "00:00:00:00:00:51" corresponding to the next hop IP address "133.0.0.51". Subsequently, Ethernet section 23 generates an Ethernet frame by adding the header of an Ethernet protocol in which the source MAC address is "00:00:00:00:00:23" and the destination MAC address is "00:00:00:00:00:51", and sends the Ethernet frame to GW 5 which is wired thereto.

Upon receipt of the packet from AP 2, GW 5 refers to the routing table in GW 5 and sends the packet to Internet 6 that has the most logical accessibility to the destination IP address "133.0.0.31" of the IP header.

Upon receipt of the packet from GW 5, Internet 6 refers to the routing table in Internet 6 and sends the packet to HUB 7 that has the most logical accessibility to the destination IP address "133.0.0.31" of the IP header.

Upon receipt of the frame from Internet 6, HUB 7 refers to the destination MAC address "00:00:00:00:00:31" contained in the packet and sends it to WLC 3 that has the destination MAC address.

Upon receipt of the frame from HUB 7, Ethernet section 31 of WLC 3 refers to the destination MAC address "00:00:00:00:00:31" of the Ethernet frame. Since the destination MAC address "00:00:00:00:00:31" of the Ethernet frame corresponds to the MAC address "00:00:00:00:00:31" of Ethernet section 31, Ethernet section 31 removes the header of the Ethernet protocol and sends the generated IP packet to IP section 32.

IP section 32 checks the correspondence between the destination IP address in the IP header of the IP packet received from Ethernet section 31 and the IP address "133.0.0.31" of Ethernet section 31 of WLC 3. According to the results, the destination IP address "133.0.0.31" of the IP header corresponds to the IP address "133.0.0.31" of Ethernet section 31 of WLC 3, so that IP section 32 removes the IP header and refers to the destination port number in the generated data. Since the application corresponding to the destination port number "443" is login page distributor 33, IP section 32 sends data to login page distributor 33.

Subsequently, in sequence S006, login page distributor 33 temporarily stores in the storage area of login page distributor 33, the MAC address "00:00:00:00:00:23" of Ethernet section 23 of AP 2, and the MAC address "00:00:00:00:00:11" of wireless LAN interface section 11 of terminal 1 contained in the URL in the request of the https data received from IP section 32. Afterwards, login page distributor 33 transmits, data of the Web page serving as an https authentication window to Internet browser section 13 of terminal 1 through IP section 22.

Subsequently, in sequence S007, after receiving data of the Web page serving as an https authentication window from login page distributor 33, Internet browser section 13 of terminal 1 displays the received Web page on the screen of terminal 1. The user inputs the ID "user" and the password "musen" for authentication to Internet browser section 13. Internet browser section 13 transmits the input ID "user" and password "musen" with https to login page distributor 33 of WLC 3 through IP section 12.

Subsequently, in sequence S008, login page distributor 33 receives the ID "user" and the password "musen" for authentication in the forms of https from Internet browser section 13, and sends the received ID "user" and the password "musen" to Radius Client section 34. At this time, process ID 335 issued by the OS in WLC 3 upon startup of Radius Client section 34 is issued to login page distributor 33. Login page distributor 33 sends, to session table 36, the source IP address "192.168.0.11" given when data has been received, the source port number "10013", the MAC address "00:00:00:00:00:23" of Ethernet section 23 of AP 2 and the MAC address "00:00:00:00:00:11" of wireless LAN interface section 11 of terminal 1 temporarily stored in the storage area in login page distributor 33, and process ID 335 issued when data was sent to Radius Client section 34.

Next, in sequence S009, Radius Client section 34 sends the authentication request with the ID "user" and the password "musen" received from login page distributor 33 to Radius Server section 43 of Radius 4 through IP section 32.

Afterwards, in sequence S010, Radius Server section 43 of Radius 4 performs comparison between the ID "user" and the password "musen" contained in the authentication request received from Radius Client section 34 of WLC 3 through IP section 42, and the ID and the password in Radius Server section 43, and, since they match, sends back a message indicating the success of authentication to Radius Client section 34 through IP section 42.

Further, in sequence S011, after receiving the message indicating the success of authentication from Radius Server section 43 of Radius 4 through IP section 32, Radius Client section 34 of WLC 3 sends the authentication results, which have been received from Radius Server section 43, to login page distributor 33.

Subsequently, in sequence S012, after receiving the authentication results from Radius Client section 34, login page distributor 33 searches session table 36 by using, as a key, process ID 335 of Radius Client section 34 from which the authentication results have been transmitted, acquires the corresponding record which is the source IP address "192.168.0.11" given when data has been received, the source port number "10013", the MAC address "00:00:00:00:00:23" of Ethernet section 23 of AP 2, and the MAC address "00:00:00:00:00:11" of wireless LAN interface section 11 of terminal 1, and temporarily stores them in the storage area in login page distributor 33.

Afterwards, login page distributor 33 sends the MAC address "00:00:00:00:00:23" of Ethernet section 23 of AP 2 temporarily stored in the storage area of login page distributor 33 to AP table 37 and acquires the IP address "133.0.0.23" of Ethernet section 23 of AP 2. Login page distributor 33 then sends the acquired IP address "133.0.0.23" of Ethernet section 23 of AP 2 and the MAC address "00:00:00:00:00:11" of wireless LAN interface section 11 of terminal 1 to Web Client section 35.

Further, in sequence S013, upon receipt of the IP address "133.0.0.23" of Ethernet section 23 of AP 2 and the MAC address "00:00:00:00:00:11" of wireless LAN interface section 11 of terminal 1 from login page distributor 33, Web Client section 35 transmits the MAC address "00:00:00:00:00:11" of wireless LAN interface section 11 of terminal 1 in the form of https to control information receiver 25 of AP 2 via IP section 32, assuming that the IP address "133.0.0.23" of Ethernet section 23 of AP 2 is the destination IP address and the port number is "443".

Further, in sequence S014, upon receipt of the MAC address "00:00:00:00:00:11" of wireless LAN interface section 11 of terminal 1 in the form of https from Web Client section 35 of WLC 3 via IP section 22, control information receiver 25 of AP 2 sends the IP address request containing the received MAC address "00:00:00:00:00:11" to ARP table 27.

Subsequently, in sequence S015, control information receiver 25 acquires an IP address replay containing the IP address "192.168.0.11" corresponding to the MAC address "00:00:00:00:00:11".

Afterwards, in sequence S016, control information receiver 25 sends the received MAC address "00:00:00:00:00:11" and the acquired IP address "192.168.0.11" of wireless LAN interface section 11 of terminal 1 to control table 26. After data is sent, control information receiver 25 generates data of a response message with https, which indicates the completion of transmission of data of the MAC address "00:00:00:00:00:11" of wireless LAN interface section 11 of terminal 1 corresponding to the IP address "133.0.0.23" of Ethernet section 23 of AP 2, and transmits https data to Web Client section 35 of WLC 3 via IP section 22.

Further, in sequence S017, after receiving an https response message indicating that the transmission of data of the MAC address "00:00:00:00:00:11" of wireless LAN interface section 11 of terminal 1 to the IP address "133.0.0.23" of Ethernet section 23 of AP 2 has been completed, from control information receiver 25 of AP 2 via IP section 32, Web Client section 35 of WLC 3 transmits a message notifying that the transmission of data of the MAC address "00:00:00:00:00:11" of wireless LAN interface section 11 of terminal 1 to the IP address "133.0.0.23" of Ethernet section 23 of AP 2 has been completed, to login page distributor 33.

Further, in sequence S018, after receiving, from Web Client section 35, a notification of the completion of data transmission of the MAC address "00:00:00:00:00:11" of wireless LAN interface section 11 of terminal 1 to the IP address "133.0.0.23" of Ethernet section 23 of AP 2, login page distributor 33 transmits, to session table 36, a request for record removal using the MAC address "00:00:00:00:00:11" of wireless LAN interface section 11 of terminal 1 as a key, and the related record is removed. Afterwards, login page distributor 33 transmits data of the Web page showing the success of authentication in the form of https to Internet browser section 13 of terminal 1 via IP section 32.

Through the above-described operation, Internet browser section 13 of terminal 1 receives the https screen of the notification of the success of authentication, from login page distributor 33 of WLC 3 via IP section 12. Then, communication with Internet 6 through terminal 1 can be performed as intended by the user, without redirection by IP section 22 of AP 2.

[After Authentication]

The operation after authentication will now be explained. After reception of the notification of the success of authentication, the user operates Internet browser section 13 of terminal 1 to access to the Web page of the URL "http://www.******.ne.jp/" in server 8.

Internet browser section 13 of terminal 1 generates data of an access request for access to the URL "http://www.****.ne.jp/" designated by the user. The DNS resolver function in Internet browser section 13 then resolves the destination IP address corresponding to the destination URL "http://www.****.ne.jp/", and acquires the corresponding destination IP address "133.0.0.1". Subsequently, Internet browser section 13 sends the destination IP address "133.0.0.1" and http data to IP section 12.

IP section 12 generates an IP packet by adding the header of an IP protocol in which "192.168.0.11" is set to the source IP address and the destination IP address "133.0.0.1" received from Internet browser section 13 is set to the destination IP address, to the data received from Internet browser section 13.

IP section 12 refers to the destination IP address "133.0.0.1" of the generated IP packet and verifies it against the routing table held in IP section 12. According to the results of the verification, IP section 12 determines that the Ethernet section having the most logical accessibility to the destination IP address "133.0.0.1" is wireless LAN interface section 11 and the next hop IP address is "192.168.0.21", and sends an IP packet and the next hop IP address "192.168.0.21" to wireless LAN interface section 11 to allow for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21 of AP 2 which is wirelessly connected thereto.

Upon receipt of the frame from wireless LAN interface section 11 of terminal 1, wireless LAN interface section 21 of AP 2 refers to the destination MAC address of the Ethernet frame. Since the destination MAC address "00:00:00:00:00:21" of the Ethernet frame corresponds to the MAC address "00:00:00:00:00:21" of wireless LAN interface section 21, wireless LAN interface section 21 removes the header of the Ethernet protocol and sends the generated IP packet to IP section 22.

Upon receipt of the packet from wireless LAN interface section 21, IP section 22 checks if the destination IP address of the IP header corresponds to the IP address of wireless LAN interface section 21 of AP 2 or the IP address of Ethernet section 23. According to the results, the destination IP address "133.0.0.1" of the IP header does not correspond to the IP address of wireless LAN interface section 21 of AP 2 "192.168.0.21" or the IP address of Ethernet section 23 "133.0.0.23", so that IP section 22 checks if the Ethernet section from which the packet has been received is Ethernet section 23. According to the results, the Ethernet section does not correspond to Ethernet section 23 because the packet has been received from wireless LAN interface section 21. Accordingly, IP section 22 then checks if the source IP address of the IP header "192.168.0.11" is present on control table 26. According to the results, the source IP address "192.168.0.11" of the IP header is present on control table 26, so that IP section 22 refers to the destination IP address of the IP header and verifies it against the routing table held in IP section 22.

According to the results of the verification, IP section 22 determines that the Ethernet section having the most logical accessibility to the destination IP address is Ethernet section 23 and the next hop IP address is "133.0.0.51", and sends an IP packet and the next hop IP address "133.0.0.51" to Ethernet section 23 to allow for transmission.

Ethernet section 23 receives the IP packet and the next hop IP address "133.0.0.51" from IP section 22 and sends a MAC address request to the ARP table in Ethernet section 23 with the next hop IP address "133.0.0.51", thereby obtaining the MAC address "00:00:00:00:00:51" corresponding to the next hop IP address "133.0.0.51". Subsequently, Ethernet section 23 generates an Ethernet frame by adding the header of an Ethernet protocol in which the source MAC address is "00:00:00:00:00:23" and the destination MAC address is "00:00:00:00:00:51", and sends the Ethernet frame to GW 5 which is wired thereto.

Upon receipt of the packet from AP 2, GW 5 refers to the routing table in GW 5 and sends the packet to Internet 6 that has the most logical accessibility to the destination IP address "133.0.0.1" of the IP header.

Internet 6 refers to the destination IP address "133.0.0.1" of the IP header of the packet, and transmits the packet, which has been received from GW 5, to webserver 8 having the corresponding IP address "133.0.0.1".

Upon receipt of http data from Internet 6, webserver 8 refers to the request URL contained in the data and acquires the request URL "http://www.****.ne.jp/". Subsequently, webserver 8 sends the data of the Web page corresponding to the request URL "http://www.****.ne.jp/" to terminal 1 through Internet 6.

Upon receipt of the data of the Web page of the URL "http://www.******.ne.jp/" from webserver 8, terminal 1 displays the data of the Web page on the screen provided to the terminal.

As described above, according to this exemplary embodiment, distribution of user traffic can avoid the concentration of traffic to a management node. This is because AP 2 receives, from WLC 3, information about terminals the traffic of which can be sent to Internet 6 and AP 2 performs filtering in AP 2 on the basis of the information, thereby allowing user traffic to be sent directly from AP 2 to Internet 6 without being sent to WLC 3.

Second Exemplary Embodiment

A communication management system according to a second exemplary embodiment of the present invention will now be described. The communication management system according to the second exemplary embodiment differs from the first exemplary embodiment in that it manages the judgement of the availability of communication, with the use of IP addresses instead of MAC addresses.

Figure 10:
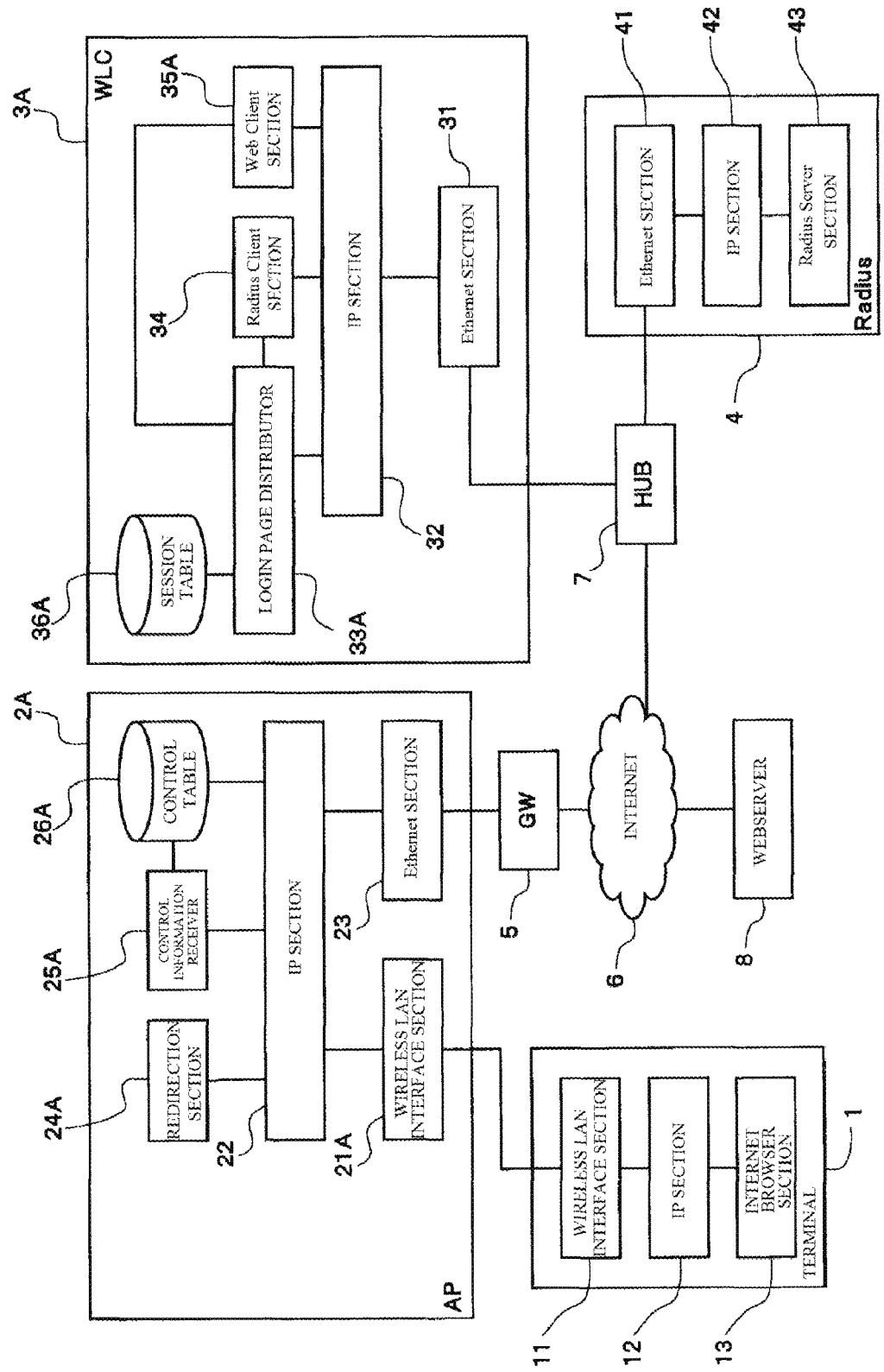
FIG. 10 is a schematic configuration diagram of a communication management system according to a second embodiment of the present invention.

The configuration of the communication management system according to the second exemplary embodiment will now be briefly described with reference to FIG. 10. It should be noted that the description of the same configuration as the first exemplary embodiment will be omitted. The communication management system according to the second exemplary embodiment includes terminal 1, AP 2A, WLC 3A, and Radius 4. Terminal 1 and Radius 4 have the same configurations as those in the first exemplary embodiment and their description will therefore be omitted.

Compared with AP 2 of the first exemplary embodiment, AP 2A includes wireless LAN interface section 21A instead of wireless LAN interface section 21, redirection section 24A instead of redirection section 24, and control information receiver 25A instead of control information receiver 25, and control table 26A instead of control table 26. In addition, the second exemplary embodiment does not include ARP table 27 unlike the first exemplary embodiment.

Compared with WLC 3 of the first exemplary embodiment, WLC 3A includes login page section 33A instead of login page distributor 33, Web Client section 35A instead of Web Client section 35, and session table 36A instead of session table 36. In addition, the second exemplary embodiment does not include AP table 37 unlike the first exemplary embodiment.

Redirection section 24A has a function of generating a redirect URL to be transmitted to terminal 1 and of providing a notification. Upon receipt of data, which is http data, from IP section 22, redirection section 24A sends, to IP section 22, the http data of the redirect request containing the URL obtained by adding the IP address of Ethernet section 23 and the IP address of the http requestor using the IP address, which is contained in the received http data, as a key, to the URL of the login page of login page distributor 33A of WLC 3A. The MAC address of Ethernet section 23 is preliminarily stored in a built-in memory in redirection section 24A.

For example, when the IP address assigned to wireless LAN interface section 11 of terminal 1 is "192.168.0.11" and the IP address assigned to Ethernet section 23 is "133.0.0.23", the http data of the redirect request containing the URL "https://133.0.0.31/login?ap_ip=133-0-0-23&src_ip=192-168-0-11" obtained by adding the IP address of Ethernet section 23 "133.0.0.23" and the IP address "192.168.0.11" of the HTTP requestor using the IP address, which is contained in the received HTTP data, as a key, to the URL "https://133.0.0.31/login?" of the login page of login page distributor 33 of WLC 3A is sent to IP section 22.

Upon receipt of data with https from Web Client section 35A of WLC 3A through IP section 22, control information receiver 25A sends the IP address contained in the received data to control table 26A. After sending data, control information receiver 25A generates data of a response message with https, which indicates reception of data of the IP address corresponding to the IP address of Ethernet section 23 of AP 2A, and transmits https data to Web Client section 35A of WLC 3A via IP section 22.

Control table 26A is a table with the IP addresses of terminals that are allowed to perform communication. Upon receipt of an IP address from control information receiver 25A, control table 26A adds the received IP address to control table 26A.

Further, upon receipt of a requirement for reference to permitted terminal's IP address 261 from IP section 22, control table 26A uses the IP address contained in the reference request to search permitted terminal's IP address 262. When the IP address contained in the reference request is included in permitted terminal's IP address 262, control table 26A sends a reference response, which contains the message that the IP address contained in the reference request is present in permitted terminal's IP address 262, to IP section 22. On the contrary, when the IP address contained in the reference request is not included in permitted terminal's IP address 262, control table 26A sends a reference response, which contains the message that the IP address contained in the reference request is absent in permitted terminal's IP address 262, to IP section 22.

Login page distributor 33A has the following functions.

[Web Page Distributing Function]

Upon receipt of a Web page request with https from terminal 1, login page distributor 33A temporarily stores the IP address of Ethernet section 23 of AP 2A and the IP address of wireless LAN interface section 11 of terminal 1 contained in the URL in the request in the received https data, in the storage area of login page distributor 33A. Afterwards, login page distributor 33A transmits, https data of the Web page serving as an https authentication window to Internet browser section 13 of terminal 1 through IP section 32.

Upon receipt of https data containing the ID and password used for authentication, login page distributor 33A transmits the received ID and password to Radius Client section 34. At this time, the process ID, which has been issued upon startup of Radius Client section 34, is issued.

After transmitting the ID and the password to Radius Client section 34, login page distributor 33A transmits, to session table 36A, a source IP address obtained upon receipt of https data, a source port number, the IP address of Ethernet section 23 of AP 2A and the IP address of wireless LAN interface section 11 of terminal 1 temporarily stored in the storage area of login page distributor 33A, and a process ID issued when data is transmitted to Radius Client section 34.

[Function of Notifying Terminal Information to AP 2A]

Upon receipt of the authentication results from Radius Client section 34, login page distributor 33A searches session table section 36A by using, as a key, the process ID of Radius Client section 34 from which the authentication results have been transmitted, and acquires the corresponding record which is the source IP address given when data has been received, the source port number, the IP address of Ethernet section 23 of AP 2A, and the IP address of wireless LAN interface section 11 of terminal 1. Login page distributor 33A then sends the acquired IP address of the Ethernet section 23 of AP 2A and the IP address of wireless LAN interface section 11 of terminal 1 to Web Client section 35A.

[Function of Finalizing Terminal Information Notification]

Upon receipt from Web Client section 35A of a notification of the completion of data transmission of the IP address of wireless LAN interface section 11 of terminal 1 to the IP address of Ethernet section 23 of AP 2A, login page distributor 33A transmits, to session table 36A, a request for record removal using the IP address of wireless LAN interface section 11 of terminal 1 as a key, and the record is removed. Afterwards, login page distributor 33A transmits data of the Web page showing the success of authentication in the form of HTTPS to Internet browser section 13 of terminal 1 via IP section 32.

Upon receipt of the IP address of wireless LAN interface section 11 of terminal 1 and the IP address of AP 2A from login page distributor 33A, Web Client section 35A provides the notification, whose destination is the IP address of AP 2A, of the IP address of wireless LAN interface section 11 of terminal 1 in the form of https, to control information receiver 25A of AP 2.

After receiving an https response message indicating that the transmission of data of the IP address of wireless LAN interface section 11 of terminal 1 to the IP address of Ethernet section 23 of AP 2A has been completed, from control information receiver 25A of AP 2 via IP section 32, Web Client section 35A transmits a message notifying that the transmission of data of the IP address of wireless LAN interface section 11 of terminal 1 to the IP address of Ethernet section 23 of AP 2A has been completed, to login page distributor 33A.

Session table 36A is a table with the source IP address of the terminal related to the authentication request, the source port number of the terminal related to the authentication request, the IP address of the AP that the terminal related to the authentication request belongs to, the IP address of the terminal related to the authentication request, and the process ID issued when login page distributor 33A sends the ID and the password related to the authentication request to Radius Client section 34.

Session table 36A does not hold data in the initial system operation state.

Upon addition of data, session table 36A receives a requirement for the addition of an element from login page distributor 33A and adds the entry using the process ID as a key.

Upon reference to data, session table 36A receives the process ID from login page distributor 33A as a research key returns the data of the corresponding entry to login page distributor 33A.

Upon deletion of data, session table 36A receives a request for deletion of an element from login page distributor 33A and deletes the record using the received process ID as a key from session table 36A.

Control table 26A shown in FIG. 10 will now be described with reference to FIG. 11. Control table 26A differs from control table 26 of the first exemplary embodiment in that it does not include permitted terminal's MAC address 261. Control table 26A consists of permitted terminal's IP address 262. Permitted terminal's IP address 262 has the IP address of, among terminals belonging to AP 2A, the terminal permitted to communicate with an external device.

In FIG. 11, for example, "192.168.0.2" and "192.168.0.3" are stored as permitted in terminal's IP address 262.

Session table 36A shown in FIG. 10 will now be described with reference to FIG. 12. Session table 36A includes source IP address 361, source port number 362, AP's IP address 363, terminal's IP address 364, and process ID 365.

Source IP address 361 stores source IP address of a terminal related to an authentication request. Source port number 362 stores the source port number of a terminal related to an authentication request. AP's IP address 363 stores the IP address of the AP to which a terminal related to an authentication request belongs. Terminal's IP address 364 stores the IP address of the terminal related to the authentication request. Further, process ID 365 stores the process ID issued when login page distributor 33A sends the ID and the password, which are related to the authentication request, to Radius Client section 34.

Figure 13:
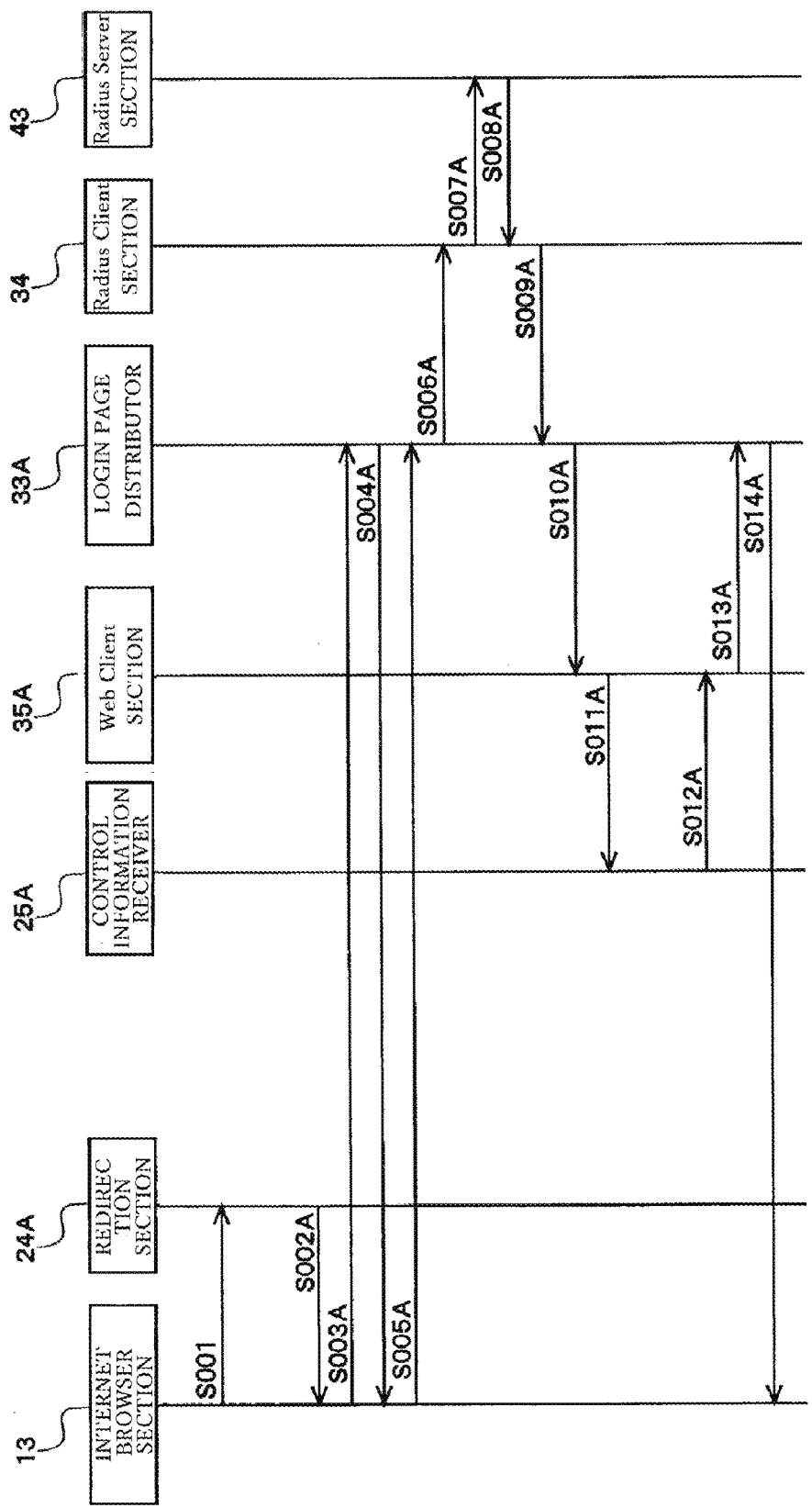
FIG. 13 is a diagram showing an operation sequence according to the second embodiment of the present invention.

The operation process of the communication management system according to the second exemplary embodiment will now be explained with reference to FIG. 13.

[Initial State]

The initial state before the start of this process will be described. Here, the user wirelessly connects terminal 1 to AP 2A, and the MAC address of the Ethernet section of each device and the corresponding IP address are as follows.

The MAC address of wireless LAN interface section 11 of terminal 1 is "00:00:00:00:00:11", and the corresponding IP address is "192.168.0.11".

The MAC address of wireless LAN interface section 21A of AP 2A is "00:00:00:00:00:21", and the corresponding IP address is "192.168.0.21".

The MAC address of Ethernet section 23 of AP 2A is "00:00:00:00:00:23", and the corresponding IP address is "133.0.0.23".

The MAC address of Ethernet section 31 of WLC 3A is "00:00:00:00:00:31", and the corresponding IP address is "133.0.0.31".

The MAC address of Ethernet section 41 of Radius 4 is "00:00:00:00:00:41", and the corresponding IP address is "133.0.0.41".

The MAC address of the Ethernet section of GW 5 is "00:00:00:00:00:51", and the corresponding IP address is "133.0.0.51".

The port number designated for the application of each device is as below.

The port number of Internet browser section 13 of terminal 1 is "10013", the port number of redirection section 24A of AP 2A is "80", the port number of redirection section 24A of AP 2 is "443", the port number of login page distributor 33A of WLC 3A is "443", the port number of Radius Client section 34 of WLC 3A is "30034", the port number of Web Client section 35A of WLC 3A is "30035", and the port number of Radius Server section 43 of Radius 4 is "1812".

The URL of webserver 8 is "http://www.******.ne.jp/" and the IP address of the target page is "133.0.0.1". The URL of login page distributor 33A of WLC 3A is "https://133.0.0.31/".

For the user account registered to Radius 4, the login ID is "user" and the password is "musen".

Further, in redirection section 24A of AP 2A, the IP address of Ethernet section 23 of AP 2A is stored in the built-in memory of redirection section 24A.

The following records are registered to control table 26A of AP 2A. In particular, the registered records are "192.168.0.21", "133.0.0.23", and "133.0.0.31" in permitted terminal's IP address 262.

It should be noted that no record is registered to session table 36A of WLC 3A.

[Before Authentication]

Sequence S001 indicating the operation of terminal 1 before authentication will now be described. There are the same steps as in the first exemplary embodiment. The steps of sequence 5002A or later are denoted by sequence that are numbers different from those in the first exemplary embodiment for convenience of description even though these steps are the same as those in the first exemplary embodiment.

When the user operates Internet browser section 13 of terminal 1 to access to the Web page of the URL "http://www.****.ne.jp/" in webserver 8, Internet browser section 13 generates data of an access request for access to the URL "http://www.**.ne.jp/" designated by the user. The DNS resolver function in Internet browser section 13 then resolves the destination IP address corresponding to the destination URL "http://www.**.ne.jp/", and acquires the corresponding destination IP address "133.0.0.1". Subsequently, Internet browser section 13 sends the destination IP address "133.0.0.1" and http data to IP section 12**.

IP section 12 generates an IP packet by adding the header of an IP protocol in which "192.168.0.11" is set to the source IP address and the destination IP address "133.0.0.1" received from Internet browser section 13 is set to the destination IP address, to the data received from Internet browser section 13.

IP section 12 refers to the destination IP address of the generated IP packet and verifies it against the routing table held in IP section 12. According to the results of the verification, IP section 12 determines that the Ethernet section having the most logical accessibility to the destination IP address is wireless LAN interface section 11 and the next hop IP address is "192.168.0.21", and sends an IP packet and the next hop IP address "192.168.0.21" to wireless LAN interface section 11 for allowing for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21A of AP 2A which is wirelessly connected thereto.

Upon receipt of the frame from wireless LAN interface section 11 of terminal 1, wireless LAN interface section 21A of AP 2A refers to the destination MAC address of the Ethernet frame. Since the destination MAC address of the Ethernet frame "00:00:00:00:00:21" corresponds to the MAC address of wireless LAN interface section 21A "00:00:00:00:00:21", the header of the Ethernet protocol is removed and the generated IP packet is sent to IP section 22.

Upon receipt of the packet from wireless LAN interface section 21A, IP section 22 checks if the destination IP address of the IP header corresponds to the IP address of wireless LAN interface section 21A of AP 2A or to the IP address of Ethernet section 23. According to the results, the destination IP address "133.0.0.1" of the IP header does not correspond to the IP address of wireless LAN interface section 21A of AP 2A "192.168.0.21" or to the IP address of Ethernet section 23 "133.0.0.23", so that IP section 22 checks if the Ethernet section from which the packet has been received is Ethernet section 23. According to the results, the Ethernet section does not correspond to Ethernet section 23 because the packet has been received from wireless LAN interface section 21A. Accordingly, IP section 22 then checks if the source IP address of the IP header "192.168.0.11" is present on control table 26A. According to the results, the source IP address of the IP header "192.168.0.11" is absent on control table 26A, so that IP section 22 then checks if the destination IP address of the IP header "133.0.0.1" is present on control table 26A. According to the results, the destination IP address of the IP header "133.0.0.1" is absent on control table 26A and IP section 22 therefore removes the header of the IP packet and transmits data to redirection section 24A.

Next, in sequence S002A, since the data transmitted from IP section 22 is an http, redirection section 24A sends to IP section 22 http data of the redirect request the redirect destination address is the URL "https://133.0.0.31/login?ap_ip=133-0-0-0-23&src_ip=192-168-0-11" that is obtained by adding the IP address of Ethernet section 23 of AP 2A "192.168.0.23" stored in the built-in memory and the IP address of the http requestor, i.e., the IP address "192.168.0.11" of wireless LAN interface section 11 of terminal 1, to the URL "https://133.0.0.31/" of the login page of login page distributor 33A of WLC 3A.

IP section 22 adds an IP header in which the source IP address is "192.168.0.21" and the destination IP address is "192.168.0.11" to data sent from redirection section 24A. Subsequently, IP section 22 checks if the destination IP address "192.168.0.11" of the IP header is the IP address of wireless LAN interface section 21A of AP 2A or the IP address of Ethernet section 23. According to the results, since the destination IP address "192.168.0.11" of the IP header does not correspond to the IP address "192.168.0.21" of wireless LAN interface section 21A of AP 2A or the IP address "133.0.0.23" of Ethernet section 23, IP section 22 then checks if the Ethernet section from which the packet has been received next is Ethernet section 23. According to the results, the Ethernet section does not correspond to Ethernet section 23 because the packet has been received from redirection section 24A. Accordingly, IP section 22 then refers to control table 26A by using the source IP address "192.168.0.21" of the IP header as a research key and checks if the source IP address "192.168.0.21" is present on control table 26A. According to the results, the source IP address "192.168.0.21" is present on control table 26A and IP section 22 refers to the destination IP address "192.168.0.11" of the IP packet, verifies it against a routing table held in IP section 22, and acquires the IP address "192.168.0.11" as the most logical next hop IP address as the next hop of the IP packet. Subsequently, IP section 22 sends the generated IP packet and the most logical next hop IP address "192.168.0.11" to wireless LAN interface section 21A having the most logical accessibility to the matching destination IP address "192.168.0.11", to allow for transmission.

Wireless LAN interface section 21A receives the IP packet and the next hop IP address "192.168.0.11" from IP section 22 and sends a MAC address request to the AP table in wireless LAN interface section 21A with the next hop IP address "192.168.0.11", thereby obtaining the MAC address "00:00:00:00:00:11" corresponding to the next hop IP address "192.168.0.11". Subsequently, wireless LAN interface section 21A generates an Ethernet frame by adding the header of an Ethernet protocol in which the source MAC address is "00:00:00:00:00:21" and the destination MAC address is "00:00:00:00:00:11", and sends the Ethernet frame to wireless LAN interface section 11 of terminal 1 which is wirelessly connected thereto.

Upon receipt of the frame from wireless LAN interface section 21A of AP 2A, wireless LAN interface section 11 refers to the destination MAC address "00:00:00:00:00:11" of the Ethernet frame. Since the destination MAC address of the Ethernet frame "00:00:00:00:00:11" corresponds to the MAC address of wireless LAN interface section 11 "00:00:00:00:00:11", wireless LAN interface section 11 removes the header of the Ethernet protocol and sends the generated IP packet to IP section 12.

IP section 12 checks the correspondence between the destination IP address in the IP header of the IP packet received from wireless LAN interface section 11 and the IP address "192.168.0.11" of wireless LAN interface section 11 of terminal 1. According to the results, the destination IP address "192.168.0.11" of the IP header corresponds to the IP address "192.168.0.11" of wireless LAN interface section 11 of terminal 1, so that IP section 12 removes the IP header and refers to the destination port number in the generated data. Since the application corresponding to the destination port number "80" is Internet browser section 13, IP section 12 sends data to Internet browser section 13.

Subsequently, in sequence 5003A, Internet browser section 13 acquires the URL "https://133.0.0.31/login?ap_ip=133-0-0-23&src_ip=192-168-0-11" of the redirect destination address contained in the redirect request of http data received from IP section 12. To access there, Internet browser section 13 then generates https data of a request for access to the URL "https://133.0.0.31/login?ap_ip=133-0-0-23&src_ip=192-168-0-11" of the redirect destination address and sends the data to IP section 12.

IP section 12 generates an IP packet by adding the header of an IP protocol in which "192.168.0.11" is set to the source IP address and "133.0.0.31" is set to the destination IP address, to the data received from Internet browser section 13.

Afterwards, IP section 12 refers to the destination IP address of the generated IP packet and verifies it against the routing table held in IP section 12. According to the results of the verification, IP section 12 determines that the Ethernet section having the most logical accessibility to the destination IP address "133.0.0.31" is wireless LAN interface section 11 and the next hop IP address is "192.168.0.21", and sends an IP packet and the next hop IP address "192.168.0.21" to wireless LAN interface section 11 to allow for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21A of AP 2A which is wirelessly connected thereto.

Upon receipt of the frame from wireless LAN interface section 11 of terminal 1, wireless LAN interface section 21A of AP 2A refers to the destination MAC address of the Ethernet frame. Since the destination MAC address "00:00:00:00:00:21" of the Ethernet frame corresponds to the MAC address "00:00:00:00:00:21" of wireless LAN interface section 21A, the header of the Ethernet protocol is removed and the generated IP packet is sent to IP section 22.

Upon receipt of the packet from wireless LAN interface section 21A, IP section 22 checks if the destination IP address of the IP header corresponds to the IP address of wireless LAN interface section 21A of AP 2A or the IP address of Ethernet section 23. According to the results, the destination IP address "133.0.0.31" of the IP header does not correspond to the IP address "192.168.0.21" of wireless LAN interface section 21A of AP 2A or the IP address "133.0.0.23" of Ethernet section 23, so that IP section 22 checks if the Ethernet section from which the packet has been received is Ethernet section 23. According to the results, the Ethernet section does not correspond to Ethernet section 23 because the packet has been received from wireless LAN interface section 21A. Accordingly, IP section 22 then checks if the source IP address of the IP header "192.168.0.11" is present on control table 26A. According to the results, the source IP address of the IP header "192.168.0.11" is absent on control table 26A, so that IP section 22 then checks if the destination IP address of the IP header "133.0.0.31" is present on control table 26A. According to the results, the destination IP address "133.0.0.31" of the IP header is present on control table 26A, so that IP section 22 refers to the destination IP address of the IP header and verifies it against the routing table held in IP section 22. According to the results of the verification, IP section 22 determines that the Ethernet section having the most logical accessibility to the destination IP address is Ethernet section 23 and the next hop IP address is "133.0.0.51", and sends an IP packet and the next hop IP address "133.0.0.51" to Ethernet section 23 for allowing for transmission.

Ethernet section 23 receives the IP packet and the next hop IP address "133.0.0.51" from IP section 22 and sends a MAC address request to the ARP table in Ethernet section 23 with the next hop IP address "133.0.0.51", thereby obtaining the MAC address "00:00:00:00:00:51" corresponding to the next hop IP address "133.0.0.51". Subsequently, Ethernet section 23 generates an Ethernet frame by adding the header of an Ethernet protocol in which the source MAC address is "00:00:00:00:00:23" and the destination MAC address is "00:00:00:00:00:51", and sends the Ethernet frame to GW 5 which is wired thereto.

Upon receipt of the packet from AP 2A, GW 5 refers to the routing table in GW 5 and sends the packet to Internet 6 that has the most logical accessibility to the destination IP address "133.0.0.31" of the IP header.

Upon receipt of the packet from GW 5, Internet 6 refers to the routing table in Internet 6 and sends the packet to HUB 7 that has the most logical accessibility to the destination IP address "133.0.0.31" of the IP header.

Upon receipt of the frame from Internet 6, HUB 7 refers to the destination MAC address "00:00:00:00:00:31" contained in the packet and sends it to WLC 3A that has the destination MAC address.

Upon receipt of the frame from HUB 7, Ethernet section 31 of WLC 3A refers to the destination MAC address "00:00:00:00:00:31" of the Ethernet frame. Since the destination MAC address "00:00:00:00:00:31" of the Ethernet frame corresponds to the MAC address "00:00:00:00:00:31" of Ethernet section 31, the header of the Ethernet protocol is removed and the generated IP packet is sent to IP section 32.

IP section 32 checks the correspondence between the destination IP address in the IP header of the IP packet received from Ethernet section 31 and the IP address "133.0.0.31" of Ethernet section 31 of WLC 3A. According to the results, the destination IP address "133.0.0.31" of the IP header corresponds to the IP address "133.0.0.31" of Ethernet section 31 of WLC 3A, so that IP section 32 removes the IP header and refers to the destination port number in the generated data. Since the application corresponding to the destination port number "443" is login page distributor 33A, IP section 32 sends data to login page distributor 33A.

Subsequently, in sequence 5004A, login page distributor 33A temporarily stores in the storage area of login page distributor 33A, the IP address "133.0.0.23" of Ethernet section 23 of AP 2A, and the IP address "192.168.0.11" of wireless LAN interface section 11 of terminal 1 contained in the URL in the request of the data received from IP section 32. Afterwards, login page distributor 33A transmits, https data of the Web page serving as an https authentication window to Internet browser section 13 of terminal 1 through IP section 23.

Subsequently, in sequence S005A, after Internet browser section 13 of terminal 1 receives data of the Web page serving as an https authentication window from login page distributor 33A, the user inputs the ID "user" and the password "musen" for authentication to Internet browser section 13. Internet browser section 13 transmits the input ID "user" and the password "musen" with https to login page distributor 33A of WLC 3A through IP section 12.

Subsequently, in sequence 5006A, login page distributor 33A receives the ID "user" and the password "musen" for authentication in the forms of https from Internet browser section 13, and sends the received ID "user" and the password "musen" to Radius Client section 34. At this time, process ID 335 that is issued by the OS in WLC 3A upon startup of Radius Client section 34 is issued to login page distributor 33A.

Login page distributor 33A sends, to session table 36A, the source IP address "192.168.0.11" given when data has been received, the source port number "10013", the IP address "133.0.0.23" of Ethernet section 23 of AP 2A and the IP address "192.168.0.11" of wireless LAN interface section 11 of terminal 1 temporarily stored in the storage area in login page distributor 33A, and process ID 335 that is issued when data has been sent to Radius Client section 34.

Next, in sequence S007A, Radius Client section 34 sends the authentication request with the ID "user" and the password "musen" received from login page distributor 33A to Radius Server section 43 of Radius 4 through IP section 32.

Next, in sequence 5008A, Radius Server section 43 of Radius 4 performs comparison between the ID "user" and the password "musen" contained in the authentication request received from Radius Client section 34 of WLC 3A through IP section 42, and the ID and the password in Radius Server section 43, and, since they match, sends back a message indicating the success of authentication to Radius Client section 34 through IP section 42.

Next, in sequence 5009A, after receiving the message indicating the success of authentication from Radius Server section 43 of Radius 4 through via IP section 32, Radius Client section 34 of WLC 3A sends the authentication results, which have been received from Radius Server section 43, to login page distributor 33A.

Subsequently, in sequence S010A, after receiving the authentication results from Radius Client section 34, login page distributor 33A searches session table 36A by using, as a key, process ID 335 of Radius Client section 34 from which the authentication results have been transmitted, acquires the corresponding record which is the source IP address "192.168.0.11" given when data has been received, the source port number "10013", the IP address "133.0.0.23" of Ethernet section 23 of AP 2, and the IP address "192.168.0.11" of wireless LAN interface section 11 of terminal 1, and temporarily stores them in the storage area in login page distributor 33A.

Afterwards, login page distributor 33A then sends the acquired IP address "133.0.0.23" of Ethernet section 23 of AP 2A and the IP address "192.168.0.11" of wireless LAN interface section 11 of terminal 1 to Web Client section 35A.

Further, in sequence S011A, upon receipt of the IP address "133.0.0.23" of Ethernet section 23 of AP 2A and the IP address "192.168.0.11" of wireless LAN interface section 11 of terminal 1 from login page distributor 33A, Web Client section 35A transmits the IP address "192.168.0.11" of wireless LAN interface section 11 of terminal 1 in the form of https to control information receiver 25A of AP 2A via IP section 32, assuming that the IP address "133.0.0.23" of Ethernet section 23 is the destination IP address and the port number is "443".

Afterwards, in sequence S012A, upon receipt of the IP address "192.168.0.11" of wireless LAN interface section 11 of terminal 1 in the form of https from Web Client section 35A of WLC 3A via IP section 22, control information receiver 25A of AP 2A sends the received IP address "192.168.0.11" of wireless LAN interface section 11 of terminal 1 to control table 26A.

After data is sent, control information receiver 25A generates data of a response message with https, which indicates the completion of reception of data of the IP address "192.168.0.11" of wireless LAN interface section 11 of terminal 1 corresponding to the IP address "133.0.0.23" of Ethernet section 23 of AP 2A, and transmits https data to Web Client section 35A of WLC 3A via IP section 22.

Subsequently, in sequence S013A, after receiving an https response message indicating that the transmission of data of the IP address "192.168.0.11" of wireless LAN interface section 11 of terminal 1 to the IP address "133.0.0.23" of Ethernet section 23 of AP 2A has been completed, from control information receiver 25A of AP 2A via IP section 32, Web Client section 35A of WLC 3A transmits a message notifying that the transmission of data of the IP address "192.168.0.11" of wireless LAN interface section 11 of terminal 1 to the IP address "133.0.0.23" of Ethernet section 23 has been completed, to login page distributor 33A.

Afterwards, in sequence S014A, after receiving, from Web Client section 35A, a notification of the completion of data transmission of the IP address "192.168.0.11" of wireless LAN interface section 11 of terminal 1 to the IP address "133.0.0.23" of Ethernet section 23 of AP 2A, login page distributor 33A transmits, to session table 36A, a request for record removal using the IP address "192.168.0.11" of wireless LAN interface section 11 as a key, and the related record is removed. Subsequently, login page distributor 33A transmits data of the Web page showing the success of authentication in the form of https to Internet browser section 13 of terminal 1 via IP section 32.

Through the above-described operation, Internet browser 13 of terminal 1 receives the https of the notification of the success of authentication, from login page distributor 33A of WLC 3A via IP section 12. After that, communication with Internet 6 through terminal 1 can be performed as intended by the user, without redirection by IP section 22 of AP 2A.

[After Authentication]

After reception of the notification of the success of authentication, when the user operates Internet browser section 13 of terminal 1 to access the Web page of the URL "http://www.****.ne.jp/" in server 8, Internet browser section 13 generates data of an access request for access to the URL "http://www.**.ne.jp/" designated by the user. The DNS resolver function in Internet browser section 13 then resolves the destination IP address corresponding to the destination URL "http://www.****.ne.jp/", and acquires the corresponding destination IP address "133.0.0.1". Subsequently, the destination IP address "133.0.0.1" and http data are sent to IP section 12.

IP section 12 generates an IP packet by adding the header of an IP protocol in which "192.168.0.11" is set to the source IP address and the destination IP address "133.0.0.1" received from Internet browser section 13 is set to the destination IP address, to the data received from Internet browser section 13.

IP section 12 refers to the destination IP address of the generated IP packet and verifies it against the routing table held in IP section 12. According to the results of the verification, IP section 12 determines that the Ethernet section having the most logical accessibility to the destination IP address is wireless LAN interface section 11 and the next hop IP address is "192.168.0.21", and sends an IP packet and the next hop IP address "192.168.0.21" to wireless LAN interface section 11 for allowing for transmission.

Wireless LAN interface section 11 receives the IP packet and the next hop IP address "192.168.0.21" from IP section 12 and sends a MAC address request to the ARP table in wireless LAN interface section 11 with the next hop IP address "192.168.0.21", thereby obtaining the MAC address "00:00:00:00:00:21" corresponding to the next hop IP address "192.168.0.21". Subsequently, wireless LAN interface section 11 generates an Ethernet frame by adding the header of an Ethernet protocol in which the source MAC address is "00:00:00:00:00:11" and the destination MAC address is "00:00:00:00:00:21", and sends the Ethernet frame to wireless LAN interface section 21A of AP 2A which is wirelessly connected thereto.

Upon receipt of the frame from wireless LAN interface section 11 of terminal 1, wireless LAN interface section 21A of AP 2A refers to the destination MAC address of the Ethernet frame. Since the destination MAC address of the Ethernet frame "00:00:00:00:00:21" corresponds to the MAC address of wireless LAN interface section 21A "00:00:00:00:00:21", wireless LAN interface section 21A removes the header of the Ethernet protocol and sends the generated IP packet to IP section 22.

Upon receipt of the packet from wireless LAN interface section 21A, IP section 22 checks if the destination IP address of the IP header corresponds to the IP address of wireless LAN interface section 21A of AP 2A or the IP address of Ethernet section 23. According to the results, the destination IP address "133.0.0.1" of the IP header does not correspond to the IP address of wireless LAN interface section 21A of AP 2A "192.168.0.21" or to the IP address of Ethernet section 23 "133.0.0.23", so that IP section 22 checks if the Ethernet section from which the packet has been received is Ethernet section 23. According to the results, the Ethernet section does not correspond to Ethernet section 23 because the packet has been received from wireless LAN interface section 21A. Accordingly, IP section 22 then checks if the source IP address of the IP header "192.168.0.11" is present on control table 26A. According to the results, the source IP address "192.168.0.11" of the IP header is present on control table 26A, so that IP section 22 refers to the destination IP address of the IP header and verifies it against the routing table held in IP section 22. According to the results of the verification, IP section 22 determines that the Ethernet section having the most logical accessibility to the destination IP address is Ethernet section 23 and the next hop IP address is "133.0.0.51", and sends an IP packet and the next hop IP address "133.0.0.51" to Ethernet section 23 to allow for transmission.

Ethernet section 23 receives the IP packet and the next hop IP address "133.0.0.51" from IP section 22 and sends a MAC address request to the ARP table in Ethernet section 23 with the next hop IP address "133.0.0.51", thereby obtaining the MAC address "00:00:00:00:00:51" corresponding to the next hop IP address "133.0.0.51". Subsequently, Ethernet section 23 generates an Ethernet frame by adding the header of an Ethernet protocol in which the source MAC address is "00:00:00:00:00:23" and the destination MAC address is "00:00:00:00:00:51", and sends the Ethernet frame to GW 5 which is wired thereto.

Upon receipt of the packet from AP 2A, GW 5 refers to the routing table in GW 5 and sends the packet to Internet 6 that has the most logical accessibility to the destination IP address "133.0.0.1" of the IP header.

Internet 6 refers to the destination IP address "133.0.0.1" of the IP header of the packet, and transmits the packet, which has been received from GW 5, to webserver 8 having the corresponding IP address "133.0.0.1".

Upon receipt of http data from Internet 6, webserver 8 refers to the request URL contained in the data and acquires the request URL "http://www.****.ne.jp/". Subsequently, webserver 8 sends the data of the Web page corresponding to the request URL "http://www.****.ne.jp/" to terminal 1 through Internet 6.

Upon receipt of the data of the Web page of the URL "http://www.******.ne.jp/" from webserver 8, terminal 1 displays the data of the Web page on the screen provided to terminal 1.

As described above, according to the second exemplary embodiment, distribution of communication traffic can avoid concentration of communication traffic at a management node. This is because AP 2A receives, from WLC 3A, information about terminals whose traffic of which can be sent to Internet 6 and AP 2A performs filtering in AP 2A on the basis of the information, thereby allowing communication traffic to be sent directly from AP 2A to Internet 6 without being sent to WLC 3A.

It should be noted that the above-described exemplary embodiments are preferred exemplary embodiments of the present invention and various modifications can be made without departing from the scope of the present invention. For example, the processes in the above exemplary embodiments can be performed with a hardware, a software, or a combination thereof.

When a process is performed with software, a program with a process sequence can be installed to memory in a computer mounted in dedicated hardware and executed. Alternatively, a program can be installed in a general-purpose computer that can perform various processes, and executed.

This application is based upon and claims the benefit of priority from Japanese Patent Application No. 2015-059488, filed on Mar. 23, 2015; the entire contents of which are incorporated herein by reference.

REFERENCE SIGNS LIST 1 terminal
2, 2A AP
3, 3A WLC
4 Radius
5 GW
6 Internet
7 HUB
8 webserver
11, 21, 21A wireless LAN interface section
12, 22, 32, 42 IP section
13 Internet browser section
23, 31, 41 Ethernet section
24, 24A redirection section
25, 25A control information receiver
26, 26A control table
27 ARP table
33, 33A login page distributor
34 Radius Client section
35, 35A Web Client section
36, 36A session table 37 AP table
43 Radius Server section

What is claimed is:

1. A communication management system in which an access point that controls the connection of a terminal trying to connect through wireless communication, and a communication management device that manages a plurality of said access points are connected to each other via a network, said access point comprising:
- a permitted terminal information storage that stores permitted terminal information for specifying a permitted terminal permitted to communicate with the network;
- a control unit that checks whether connection request terminal information for specifying a connection request terminal requesting a connection to the network through wireless communication is stored as the permitted terminal information in said permitted terminal information storage, and when said connection request terminal information is stored as the permitted terminal information in said permitted terminal information storage, permits the connection request to the network of the connection request terminal based on the permitted terminal information;
- an access information generator that, when said connection request terminal information is not stored as the permitted terminal information in said permitted terminal information storage, generates access information obtained by adding the connection request terminal information and access point information for specifying the access point to information used for accessing provider information that provides an authentication window through which connection authentication information allowing the connection request terminal to connect to the network is input;
- an access information transmitter that transmits access information generated by said access information generator to the connection request terminal; and
- a permission information receiver that receives the permitted terminal information from said communication management device, and said communication management device comprising:
- a communication unit that transmits the provider information to the connection request terminal and receives, from the connection request terminal, the connection authentication information input to the authentication window provided according to the provider information, when the connection request terminal tries to connect to the network according to the access information;
- a terminal information storage that stores the connection request terminal information and the access point information contained in the access information;
- an authentication unit that authenticates the connection request terminal, according to the connection authentication information received by said communication unit; and
- a permitted terminal information transmitter that transmits, when said authentication unit authenticates the connection request terminal, permitted terminal information, permitting the connection request terminal to communicate with the network, together with the connection request terminal information to the access point specified by the access point information stored in said terminal information storage.

2. The communication management system according to claim 1, wherein
- the access point comprises an ARP table that stores a corresponding relationship between a MAC address and an IP address, and
- when the connection request terminal information is an IP address, said access information generator refers to the ARP table and acquires a MAC address corresponding relationship to the IP address as the connection request terminal information.

3. The communication management system according to claim 1, wherein
- the communication management device comprises an AP table that stores a correspondence between a MAC address and an IP address of the access point, and
- when the access point information stored in said terminal information storage is a MAC address, said permitted terminal information transmitter refers to the AP table and acquires an IP address corresponding to the MAC address as the access point information.

4. An access point that controls the connection of a terminal trying to connect through wireless communication, the access point comprising:
- a permitted terminal information storage that stores permitted terminal information for specifying a permitted terminal permitted to communicate with a network connected to said access point;
- a control unit that checks whether connection request terminal information for specifying a connection request terminal requesting a connection to the network through wireless communication is stored as the permitted terminal information in said permitted terminal information storage, and when said connection request terminal information is stored as the permitted terminal information in said permitted terminal information storage, permits the connection request to the network of the connection request terminal based on the permitted terminal information;
- an access information generator that, when said connection request terminal information is not stored as the permitted terminal information in said permitted terminal information storage, generates access information obtained by adding the connection request terminal information and access point information for specifying said access point to information used for accessing provider information that provides an authentication window through which connection authentication information allowing the connection request terminal to connect to the network is input;
- an access information transmitter that transmits access information generated by said access information generator to the connection request terminal; and
- a permission information receiver that receives the permitted terminal information from a communication management device that is connected via the network and manages a plurality of said access points.

5. A communication management device that manages, via a network, a plurality of access points that controls the connection of a terminal trying to connect through wireless communication, the communication management device comprising:
- a communication unit that performs, when the connection request terminal, requesting a connection to the network through wireless communication, tries to connect to the network according to access information generated by adding connection request terminal information for specifying the connection request terminal and access point information for specifying said access point to information used for accessing provider information that provides an authentication window through which connection authentication information that allows connecting to the network is input, transmission of the provider information to a connection request terminal and receipt of the connection authentication information input to the authentication window provided according to the provider information from the connection request terminal;

a terminal information storage that stores the connection request terminal information and said access point information contained in the access information;

a control unit that checks whether connection request terminal information for specifying a connection request terminal requesting a connection to the network through wireless communication is stored as permitted terminal information in a permitted terminal information storage, and when said connection request terminal information is stored as the permitted terminal information in said permitted terminal information storage, permits the connection request to the network of the connection request terminal based on the permitted terminal information;

an authentication unit that authenticates the connection request terminal, according to the connection authentication information received by said communication unit; and a permitted terminal information transmitter that transmits, when said authentication unit authenticates the connection request terminal, permitted terminal information, permitting the connection request terminal to communicate with the network, together with the connection request terminal information to said access point specified by the access point information stored in said terminal information storage.

6. A communication management method for a system in which an access point that controls the connection of a terminal trying to connect through wireless communication, and a communication management device that manages a plurality of said access points are connected to each other via a network, wherein said access point involves:
  storing permitted terminal information for specifying a permitted terminal permitted to communicate with the network, in a storage;
  checking whether connection request terminal information for specifying a connection request terminal requesting a connection to the network through wireless communication is stored as the permitted terminal information in a permitted terminal information storage, and when said connection request terminal information is stored as the permitted terminal information in said permitted terminal information storage, permits the connection request to the network of the connection request terminal based on the permitted terminal information;
  generating access information when connection request terminal information is not stored as the permitted terminal information in the storage, by adding the connection request terminal information and access point information for specifying said access point to information used for accessing provider information that provides an authentication window through which connection authentication information allowing the connection request terminal to connect to the network is input;
  transmitting the generated access information to the connection request terminal; and
  receiving the permitted terminal information from the communication management device, and said communication management device involves:
  transmitting the provider information to the connection request terminal and receiving, from the connection request terminal, the connection authentication information input to the authentication window provided according to the provider information, when the connection request terminal tries to connect to the network according to the access information;
  storing the connection request terminal information and the access point information contained in the access information in a terminal information storage;
  authenticating the connection request terminal, according to the received connection authentication information; and
  transmitting, upon authentication of the connection request terminal, permitted terminal information, permitting the connection request terminal to communicate with the network, together with the connection request terminal information to said access point specified by the access point information stored in the terminal information storage.

7. A connection control method for an access point that controls the connection of a terminal trying to connect through wireless communication, the connection control method comprising:

storing permitted terminal information for specifying a permitted terminal permitted to communicate with a network connected to said access point, in a storage;

checking whether connection request terminal information for specifying a connection request terminal requesting a connection to the network through wireless communication is stored as the permitted terminal information in a permitted terminal information storage, and when said connection request terminal information is stored as the permitted terminal information in said permitted terminal information storage, permits the connection request to the network of the connection request terminal based on the permitted terminal information;

generating access information when connection request terminal information is not stored as the permitted terminal information in the storage, by adding the connection request terminal information and access point information for specifying said access point to information used for accessing provider information that provides an authentication window through which connection authentication information allowing the connection request terminal to connect to the network is input;

transmitting the generated access information to the connection request terminal; and receiving the permitted terminal information from a communication management device that is connected via the network and managing a plurality of said access points.

8. A communication management method for a communication management device that manages, via a network, a plurality of access points that controls the connection of a terminal trying to connect through wireless communication, the communication management method comprising:

performing, when the connection request terminal, that requests a connection to the network through wireless communication, tries to connect to the network according to access information generated by adding connection request terminal information for specifying the connection request terminal and access point information for specifying said access point to information used for accessing provider information that provides an authentication window through which connection authentication information that allows connecting to the network is input, transmission of the provider information to a connection request terminal and receipt of the connection authentication information input to the authentication window provided according to the provider information from the connection request terminal;

storing the connection request terminal information and the access point information contained in the access information, in a storage;

checking whether connection request terminal information for specifying a connection request terminal requesting a connection to the network through wireless communication is stored as permitted terminal information in a permitted terminal information storage, and when said connection request terminal information is stored as the permitted terminal information in said permitted terminal information storage, permits the connection request to the network of the connection request terminal based on the permitted terminal information;

authenticating the connection request terminal, according to the received connection authentication information; and transmitting, upon authentication of the connection request terminal, permitted terminal information, permitting the connection request terminal to communicate with the network, together with the connection request terminal information to said access point specified by the access point information stored in the storage.

9. A non-transitory computer readable medium recording a program executed by an access point that controls the connection of a terminal trying to connect through wireless communication, the program comprising:

storing permitted terminal information for specifying a permitted terminal permitted to communicate with a network connected to the access point, in a storage;

checking whether connection request terminal information for specifying a connection request terminal requesting a connection to the network through wireless communication is stored as the permitted terminal information in a permitted terminal information storage, and when said connection request terminal information is stored as the permitted terminal information in said permitted terminal information storage, permits the connection request to the network of the connection request terminal based on the permitted terminal information;

generating access information when connection request terminal information is not stored as the permitted terminal information in the storage, by adding the connection request terminal information and access point information for specifying said access point to information used for accessing provider information that provides an authentication window through which connection authentication information allowing the connection request terminal to connect to the network is input;

transmitting the generated access information to the connection request terminal; and receiving the permitted terminal information from a communication management device that is connected via the network and manages a plurality of said access points.

10. A non-transitory computer readable medium recording a program executed by a computer that manages, via a network, a plurality of access points that controls the connection of a terminal trying to connect through wireless communication, the program comprising:

requesting a connection to the network through wireless communication, tries to connect to the network according to access information generated by adding connection request terminal information for specifying the connection request terminal and access point information for specifying said access point to information used for accessing provider information that provides an authentication window through which connection authentication information allowing to connect to the network is input, transmission of the provider information to a connection request terminal and reception of the connection authentication information input to the authentication window provided according to the provider information from the connection request terminal;

storing the connection request terminal information and the access point information contained in the access information, in a storage;

checking whether connection request terminal information for specifying a connection request terminal requesting a connection to the network through wireless communication is stored as permitted terminal information in a permitted terminal information storage, and when said connection request terminal information is stored as the permitted terminal information in said permitted terminal information storage, permits the connection request to the network of the connection request terminal based on the permitted terminal information;

authenticating the connection request terminal, according to the received connection authentication information; and transmitting, upon authentication of the connection request terminal, permitted terminal information, permitting the connection request terminal to communicate with the network, together with the connection request terminal information to said access point specified by the access point information stored in the storage.

* * * * *